United States Patent
Hoshino

(10) Patent No.: US 8,363,091 B2
(45) Date of Patent: Jan. 29, 2013

(54) STEREOSCOPIC IMAGE PICK-UP APPARATUS

(75) Inventor: Kenji Hoshino, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/142,656

(22) PCT Filed: Nov. 22, 2010

(86) PCT No.: PCT/JP2010/070776
§ 371 (c)(1),
(2), (4) Date: Jun. 29, 2011

(87) PCT Pub. No.: WO2011/121840
PCT Pub. Date: Oct. 6, 2011

(65) Prior Publication Data
US 2011/0279653 A1 Nov. 17, 2011

(30) Foreign Application Priority Data
Mar. 31, 2010 (JP) ................................. 2010-081051

(51) Int. Cl.
*H04N 15/00* (2006.01)
*H04N 13/02* (2006.01)
(52) U.S. Cl. ........................... 348/46; 382/154; 396/322
(58) Field of Classification Search .................... 348/46; 382/154; 396/322
See application file for complete search history.

(56) References Cited

U.S. PATENT DOCUMENTS
5,740,337 A 4/1998 Okino et al.
5,786,847 A 7/1998 Katayama et al.
(Continued)

FOREIGN PATENT DOCUMENTS
CN 101080921 A 11/2007
EP 1 505 539 A2 2/2005
(Continued)

OTHER PUBLICATIONS
Translation of JP 2006-162991 "Nakazawa", generated using AIPN tool at http://dossier1.ipdl.inpit.go.jp/AIPN/odse_top_dn.ipdl?N0000=7400.*
(Continued)

*Primary Examiner* — Mehrdad Dastouri
*Assistant Examiner* — Jeremaiah C Hallenbeck-Huber
(74) *Attorney, Agent, or Firm* — Birch, Stewart, Kolasch & Birch, LLP

(57) ABSTRACT

Distortion correction with different correction accuracy is performed on images acquired in accordance with an image pick-up mode for a 3D moving image, a 3D still image, and the like, and an image cut-out process corresponding to an optical axis deviation amount of each of right and left photographing optical systems is also performed thereon, whereby optical axis deviation is corrected. In this case, an optical axis deviation amount corresponding to a current image pick-up mode is read out from among optical axis deviation amounts after distortion correction, the optical axis deviation amounts being stored in advance into an EEPROM at the time of adjustment before shipment and corresponding to respective image pick-up modes. Distortion correction corresponding to the current image pick-up mode is performed on right and left images acquired in accordance with the current image pick-up mode. Then, a cut-out process of images for stereoscopic display from the images with a full angle of view after the distortion correction is also performed on the basis of the read-out optical axis deviation amount.

16 Claims, 14 Drawing Sheets

U.S. PATENT DOCUMENTS

| | | | |
|---|---|---|---|
| 7,001,024 B2 * | 2/2006 | Kitaguchi et al. | 353/70 |
| 7,129,974 B2 * | 10/2006 | Morichika | 348/231.99 |
| 7,265,787 B2 * | 9/2007 | Takane | 348/335 |
| 7,596,286 B2 * | 9/2009 | Nose et al. | 382/300 |
| 7,636,088 B2 * | 12/2009 | Nomura et al. | 345/419 |
| 8,023,009 B2 * | 9/2011 | Cho | 348/241 |
| 2003/0223007 A1 | 12/2003 | Takane | |
| 2004/0001138 A1 | 1/2004 | Weerashinghe et al. | |
| 2005/0213159 A1 * | 9/2005 | Okada et al. | 358/3.26 |
| 2006/0274170 A1 * | 12/2006 | Azuma | 348/246 |
| 2007/0236595 A1 | 10/2007 | Pan et al. | |
| 2008/0131107 A1 * | 6/2008 | Ueno | 396/50 |
| 2008/0211956 A1 | 9/2008 | Imada et al. | |
| 2009/0115885 A1 * | 5/2009 | Shabtay et al. | 348/347 |
| 2010/0085439 A1 * | 4/2010 | Lin | 348/222.1 |

FOREIGN PATENT DOCUMENTS

| | | |
|---|---|---|
| EP | 1 635 138 A1 | 3/2006 |
| JP | 7-95623 A | 4/1995 |
| JP | 8-317424 A | 11/1996 |
| JP | 8-336165 A | 12/1996 |
| JP | 11-355813 A | 12/1999 |
| JP | 2004-7304 A | 1/2004 |
| JP | 2004-126905 A | 4/2004 |
| JP | 2004-145022 A | 5/2004 |
| JP | 2006-162991 A | 6/2006 |
| JP | 2007-282245 A | 10/2007 |
| WO | WO 2006/062325 A1 | 6/2006 |
| WO | WO 2006/064770 A1 | 6/2006 |

OTHER PUBLICATIONS

Translation of JP 08-317424 "Nakamura", generated using AIPN tool at http://dossier1.ipdl.inpit.go.jp/AIPN/odse_top_dn.ipdl?N0000=7400.*

* cited by examiner

FIG.4A

TABLE FOR THROUGH IMAGE

| Z-pos | V-LEFT | V-RIGHT |
|---|---|---|
| Z1 | 3 | −3 |
| Z2 | 5 | −5 |
| Z3 | 8 | −8 |
| Z4 | 10 | −10 |
| Z5 | 12 | −12 |
| Z6 | 14 | −14 |
| Z7 | 16 | −16 |
| Z8 | 18 | −18 |
| Z9 | 20 | −20 |
| Z10 | 22 | −22 |

FIG.4B

TABLE FOR STILL IMAGE

| Z-pos | V-LEFT | V-RIGHT |
|---|---|---|
| Z1 | 2 | −2 |
| Z2 | 4 | −4 |
| Z3 | 7 | −7 |
| Z4 | 9 | −9 |
| Z5 | 11 | −11 |
| Z6 | 13 | −13 |
| Z7 | 15 | −15 |
| Z8 | 17 | −17 |
| Z9 | 19 | −19 |
| Z10 | 21 | −21 |

FIG.4C

TABLE FOR MOVING IMAGE

| Z-pos | V-LEFT | V-RIGHT |
|---|---|---|
| Z1 | 5 | −5 |
| Z2 | 7 | −7 |
| Z3 | 10 | −10 |
| Z4 | 12 | −12 |
| Z5 | 14 | −14 |
| Z6 | 16 | −16 |
| Z7 | 18 | −18 |
| Z8 | 20 | −20 |
| Z9 | 22 | −22 |
| Z10 | 24 | −24 |

FIG.9

| (F-pos) | (Z-pos) Z1 | Z2 | Z3 | ... | Zn |
|---|---|---|---|---|---|
| F1 | 2 | 3 | 4 | ... | 10 |
| F2 | 2 | 3 | | | |
| F3 | 2 | 4 | | | |
| F4 | 2 | 4 | | | |
| ⋮ | ⋮ | ⋮ | | | |
| Fn | 2 | 5 | | | |

FIG.10

| (F-pos) | (Z-pos) Z1 | Z2 | Z3 | ... | Zn |
|---|---|---|---|---|---|
| NEAR | 2 | 3 | 4 | ... | 10 |
| CALCULATION | | | | | |
| CALCULATION | | LINEARLY CALCULATE OR CALCULATE BY 1/DISTANCE. | | | |
| CALCULATION | | | | | |
| CALCULATION | | | | | |
| CALCULATION | | | | | |
| InF | 4 | 5 | 6 | ... | 18 |

FIG.11

ACQUIRE IMAGES — S482

PERFORM SHADING CORRECTION — S483

PERFORM DISTORTION CORRECTION — S484

PERFORM CUT-OUT — S486

SAVE IMAGES — S488

STEREOSCOPIC IMAGE PICK-UP APPARATUS

TECHNICAL FIELD

The present invention relates to a stereoscopic image pick-up apparatus, and more particularly, to a stereoscopic image pick-up apparatus which photographs a plurality of images having a parallax therebetween.

BACKGROUND ART

In a stereoscopic image pick-up apparatus, with the use of two image pick-up units which are arranged with a parallax to the right and left, the same subject is photographed from right and left points of view, and an image for a left eye and an image for a right eye are acquired, respectively. The right and left images thus acquired are inputted to a three-dimensional (3D) display capable of displaying in a 3D manner, and are displayed so as to be viewable separately by the right and left eyes, whereby the right and left images can be recognized as a stereoscopic image.

Normally, optical systems having the same performance and characteristics are used as photographing optical systems of the two image pick-up units, and the respective photographing optical systems are adjusted and incorporated in an apparatus main body so that optical axes thereof coincide with each other.

However, there is individual variability between the two photographing optical systems. Therefore, when a change in zoom factor together with a lens movement or the like is performed, there arises a problem that the optical axes of the two photographing optical systems deviate in accordance with a zoom position. In addition, it is extremely difficult to mechanically adjust the optical axes so that the optical axis deviation does not occur over an entire zoom range.

Up to now, in order to solve this problem, there has been proposed a stereoscopic image pick-up apparatus in which: storage means which stores therein optical axis deviation of the two photographing optical systems for each zoom position is provided; corresponding optical axis deviation is read out from the storage means in accordance with the zoom positions of the photographing optical systems at the time of photographing; coordinates of one image of the photographed right and left images are converted on the basis of the read-out optical axis deviation; and accordingly, coordinates of optical axes of the right and left images are made coincident with each other (PTL 1).

In addition, PTL 2 discloses a stereoscopic image pick-up apparatus including: a first lens barrel including a CCD for obtaining photographing information on a right eye; a second lens barrel including a CCD for obtaining photographing information on a left eye; a camera detection circuit which detects focal lengths of the first lens barrel and the second lens barrel; a ROM which is formed of an EEPROM and the like, and stores therein in advance a deviation amount of an optical axis center of each of the first lens barrel and the second lens barrel for each focal length; and a CPU which controls an image cut-out area within at least one of the paired right and left CCDs for each focal length on the basis of an output from the ROM.

On the other hand, PTL 3 discloses an image processing apparatus in which: an approximate expression for coordinate correction with respect to a lens center as the reference is set to lens characteristics of a stereo camera; and projection coordinates of a target image captured by the camera are corrected on the basis of the approximate expression.

CITATION LIST

Patent Literature

{PTL 1}
Japanese Patent Application Laid-Open No. 2006-162991
{PTL 2}
Japanese Patent Application Laid-Open No. 08-317424
{PTL 3}
Japanese Patent Application Laid-Open No. 2004-126905

SUMMARY OF INVENTION

Technical Problem

PTL 1 and PTL 2 disclose a technology in which the optical axis deviation caused by the individual variability between the two photographing optical systems is corrected by: converting the coordinates of one image of the right and left images on the basis of the optical axis deviation amount which is acquired in advance for each zoom position; or changing an image cut-out range. In addition, PTL 3 discloses a technology of correcting image distortion caused by lens distortion.

Incidentally, even in the case where the optical axis deviation between the two photographing optical systems is corrected by converting the coordinates of the photographed image or adjusting the image cut-out range as in the inventions disclosed in PTL 1 and PTL 2, if distortion correction for correcting the image distortion (such as barrel distortion and pincushion distortion) caused by the lens distortion as disclosed in PTL 3 is thereafter performed on the right and left images, there arises a problem that the optical axis is deviated by this distortion correction.

For example, assuming that an optical axis center of an image for a left eye with barrel distortion is $O_L$ and an optical axis center of an image for a right eye with barrel distortion is $O_R$ as illustrated in FIG. 20, optical axis centers of these images after the distortion correction are $O_L'$ and $O_R'$, respectively, and the optical axis centers deviate by $\Delta H$ and $\Delta V$ in the horizontal direction and the vertical direction.

In addition, the distortion correction is performed by substituting for calculation a coordinate value of each pixel into a distortion correction formula which is a high-order polynomial, and hence the amount of calculation is large. For example, in the case where a distortion correction formula with high correction accuracy is used at the time of photographing a 3D moving image to perform the distortion correction, there arises a problem that it is difficult to photograph and record a high-definition (HD) 3D moving image at a high frame rate.

Therefore, in the case of the 3D moving image, the distortion correction is not performed, or alternatively, a low-order distortion correction formula is used to perform distortion correction with low correction accuracy.

On the other hand, the distortion correction of a 3D still image may be performed after the photographing before the image is written into a memory card, and hence a distortion correction formula with high correction accuracy can be used to perform distortion correction with high correction accuracy.

In the case as described above where the distortion correction formulae with different correction accuracies are used for the 3D moving image and the 3D still image, respectively, there arises a problem that the optical axis center after the distortion correction deviates in accordance with the used distortion correction formula.

The present invention has been made in view of the above-mentioned circumstances, and therefore has an object to provide a stereoscopic image pick-up apparatus capable of obtaining, even in the case of performing distortion correction with correction accuracy which is different for each image pick-up mode for photographing a 3D moving image, a 3D still image, or the like, a plurality of images which do not have optical axis deviation between images for stereoscopic view after the distortion correction and thus are easy to stereoscopically view.

Solution to Problem

In order to achieve the above-mentioned object, according to a first aspect of the present invention, there is provided a stereoscopic image pick-up apparatus including: a plurality of image pick-up units each including: a photographing optical system; and an image pick-up element which subjects a subject image formed via the photographing optical system to photoelectric conversion, the plurality of image pick-up units picking up a plurality of images having a parallax between the plurality of image pick-up units; a first storage unit which stores therein a distortion correction formula which is set for each of a plurality of image pick-up modes, the distortion correction formula having correction accuracy which is different for each of the plurality of image pick-up modes; a distortion correction formula acquisition unit which acquires a distortion correction formula corresponding to a current image pick-up mode from among the distortion correction formulae stored in the first storage unit; a second storage unit which stores therein a previously detected optical axis deviation amount of each photographing optical system included in the plurality of image pick-up units, the optical axis deviation amount having been subjected to distortion correction using the distortion correction formula which is set for each of the plurality of image pick-up modes; an optical axis deviation amount acquisition unit which acquires an optical axis deviation amount corresponding to the current image pick-up mode, on the basis of: the optical axis deviation amount of each photographing optical system stored in the second storage unit; and the current image pick-up mode; an image pick-up control unit which acquires the plurality of images from the plurality of image pick-up units in accordance with the current image pick-up mode; a distortion correction unit which performs distortion correction on the plurality of images acquired by the image pick-up control unit, on the basis of the distortion correction formula which is acquired by the distortion correction formula acquisition unit correspondingly to the current image pick-up mode; and an image cut-out unit which performs a cut-out process of images for stereoscopic display on the plurality of images acquired by the image pick-up control unit, on the basis of the optical axis deviation amount acquired by the optical axis deviation amount acquisition unit correspondingly to the current image pick-up mode.

According to the first aspect of the present invention, the optical axis deviation amount after the distortion correction corresponding to the current image pick-up mode is acquired by the optical axis deviation amount acquisition unit, and on the basis of the acquired optical axis deviation amount, the cut-out process of the images for stereoscopic display is performed on the plurality of images. Accordingly, even in the case of performing distortion correction using the distortion correction formula with correction accuracy which is different depending on the image pick-up mode, it is possible to correct the optical axis deviation without an influence of the performed distortion correction.

According to a second aspect of the present invention, the stereoscopic image pick-up apparatus according to the first aspect further includes a zoom position detection unit which detects a current zoom position of each of the plurality of photographing optical systems. In this stereoscopic image pick-up apparatus, the first storage unit stores therein the distortion correction formula according to the zoom position of each photographing optical system, and the distortion correction formula acquisition unit acquires, from the first storage unit, a distortion correction formula corresponding to the current image pick-up mode and the current zoom position of each photographing optical system.

In the case where the current image pick-up mode is set to perform distortion correction with low correction accuracy, a low-order polynomial is used as the distortion correction formula. On the other hand, in the case where the current image pick-up mode is set to perform distortion correction with high correction accuracy, a high-order polynomial is used as the distortion correction formula. In addition, in the case of storing the distortion correction formula corresponding to the zoom position, it is conceivable to store the distortion correction formula with a factor of each term which is different in accordance with the zoom position, and to store a general formula of the distortion correction formula and a factor according to the zoom position.

According to a third aspect of the present invention, in the stereoscopic image pick-up apparatus according to the first aspect or the second aspect, the second storage unit stores therein the optical axis deviation amount of each photographing optical system according to the zoom position of each of the plurality of photographing optical systems, and the optical axis deviation amount acquisition unit acquires, from the second storage unit, a corresponding optical axis deviation amount in accordance with the current image pick-up mode and the current zoom position of each photographing optical system.

That is, in addition to using the distortion correction formula with correction accuracy which is different depending on the image pick-up mode, a different distortion correction formula (a formula with a different factor or the like) is used even when the zoom position changes. Therefore, the optical axis deviation amount acquisition unit acquires the optical axis deviation amount after the distortion correction corresponding to the current image pick-up mode and the current zoom position.

According to a fourth aspect of the present invention, in the stereoscopic image pick-up apparatus according to the second aspect or the third aspect, the second storage unit stores therein, as the optical axis deviation amount of each photographing optical system, the optical axis deviation amount after the distortion correction using the distortion correction formula corresponding to each image pick-up mode and the zoom position of each photographing optical system, in accordance with each image pick-up mode and the zoom position, and the optical axis deviation amount acquisition unit includes a read-out unit which reads out, from the second storage unit, a corresponding optical axis deviation amount in accordance with the current image pick-up mode and the current zoom position.

According to a fifth aspect of the present invention, in the stereoscopic image pick-up apparatus according to the second aspect or the third aspect, the second storage unit stores therein, as the optical axis deviation amount of each photographing optical system, an optical axis deviation amount before the distortion correction, in accordance with the zoom position of each photographing optical system, and the optical axis deviation amount acquisition unit includes a calculation unit which substitutes the optical axis deviation amount which is read out from the second storage unit on the basis of the current zoom position, into the distortion correction formula which corresponds to the current image pick-up mode and is acquired by the distortion correction formula acquisition unit, to thereby calculate the optical axis deviation amount after the distortion correction.

According to the fourth aspect of the present invention, the second storage unit stores therein the optical axis deviation amount after the distortion correction using the distortion correction formula corresponding to each image pick-up mode and the zoom position, in accordance with each image pick-up mode and the zoom position, and the optical axis deviation amount corresponding to the current image pick-up mode and the current zoom position is read-out from the second storage unit. According to the fifth aspect, the second storage unit stores therein the optical axis deviation amount before the distortion correction in accordance with the zoom position, and the stored optical axis deviation amount is read out from the second storage unit on the basis of the current zoom position. Then, the read-out optical axis deviation amount is substituted into the distortion correction formula which corresponds to the current image pick-up mode and is acquired by the distortion correction formula acquisition unit, and the optical axis deviation amount after the distortion correction is thus calculated. In this way, the optical axis deviation amount after the distortion correction is obtained.

According to a sixth aspect of the present invention, in the stereoscopic image pick-up apparatus according to the second aspect or the third aspect, the second storage unit stores therein, as the optical axis deviation amount of each photographing optical system, information for calculating the optical axis deviation amount after the distortion correction using the distortion correction formula corresponding to each image pick-up mode and the zoom position of each photographing optical system, for each image pick-up mode, and the optical axis deviation amount acquisition unit includes a calculation unit which calculates a corresponding optical axis deviation amount on the basis of: the information which is read out from the second storage unit in accordance with the current image pick-up mode; and the current zoom position.

Conceivable examples of the information for calculating the optical axis deviation amount after the distortion correction corresponding to the zoom position include: optical axis deviation amounts after the distortion correction at two zoom positions, that is, the wide end and the telephoto end; and a calculation formula for linear interpolation using these optical axis deviation amounts. The optical axis deviation amount corresponding to the current image pick-up mode and the current zoom position can be calculated on the basis of this calculation formula and the current zoom position.

According to a seventh aspect of the present invention, the stereoscopic image pick-up apparatus according to the second aspect or the third aspect further includes a focus position detection unit which detects a current focus position of each of the plurality of photographing optical systems. In this stereoscopic image pick-up apparatus, the second storage unit stores therein the optical axis deviation amount after the distortion correction using the distortion correction formula corresponding to each image pick-up mode and the zoom position of each photographing optical system, in accordance with each image pick-up mode, the zoom position, and the focus position, and the optical axis deviation amount acquisition unit includes a read-out unit which reads out, from the second storage unit, a corresponding optical axis deviation amount in accordance with the current image pick-up mode, the current zoom position, and the current focus position.

The optical axis is deviated also by the focus position of the photographing optical system. Therefore, according to the seventh aspect, the second storage unit stores therein the optical axis deviation amount after the distortion correction in accordance with each image pick-up mode, the zoom position, and the focus position, and the optical axis deviation amount corresponding to the current image pick-up mode, the current zoom position, and the current focus position is read out from the second storage unit.

According to an eighth aspect of the present invention, the stereoscopic image pick-up apparatus according to the second aspect or the third aspect further includes a focus position detection unit which detects a current focus position of each of the plurality of photographing optical systems. In this stereoscopic image pick-up apparatus, the second storage unit stores therein information for calculating the optical axis deviation amount after the distortion correction using the distortion correction formula corresponding to each image pick-up mode and the zoom position of each photographing optical system, in accordance with each image pick-up mode and the zoom position, and the optical axis deviation amount acquisition unit includes a calculation unit which calculates a corresponding optical axis deviation amount on the basis of: the information which is read out from the second storage unit in accordance with the current image pick-up mode and the current zoom position; and the current focus position.

Conceivable examples of the information for calculating the optical axis deviation amount after the distortion correction using the distortion correction formula corresponding to each image pick-up mode and the zoom position of each photographing optical system include: optical axis deviation amounts after the distortion correction at two focus positions, that is, the nearest distance and the infinity; and a calculation formula for linear interpolation using these optical axis deviation amounts. The optical axis deviation amount corresponding to the current image pick-up mode, the current zoom position, and the current focus position can be calculated on the basis of this calculation formula and the current focus position.

According to a ninth aspect of the present invention, the stereoscopic image pick-up apparatus according to any one of the first aspect to the eighth aspect further includes a shading correction unit which performs shading correction on the plurality of images acquired by the image pick-up control unit. In this stereoscopic image pick-up apparatus, the image cut-out unit performs the image cut-out process on the images which have been subjected to the shading correction by the shading correction unit. After the brightnesses of the plurality of images are made uniform by the shading correction, the image cut-out process is performed, which thus enables the plurality of cut-out images to have no difference in brightness therebetween.

According to a tenth aspect of the present invention, in the stereoscopic image pick-up apparatus according to any one of the first aspect to the ninth aspect, the image cut-out unit performs the image cut-out process on the images which have been subjected to the distortion correction by the distortion correction unit. This makes it possible to cut out images without distortion from the plurality of images.

According to an eleventh aspect of the present invention, in the stereoscopic image pick-up apparatus according to any one of the first aspect to the ninth aspect, the distortion correction unit performs the distortion correction on the images which have been subjected to the cut-out process by the image cut-out unit.

According to a twelfth aspect of the present invention, in the stereoscopic image pick-up apparatus according to any one of the first aspect to the eleventh aspect, the plurality of image pick-up modes are two or more image pick-up modes of: an image pick-up mode set at a time of an operation of displaying a live view image on a display unit; a still image pick-up mode; a moving image pick-up mode; and a distortion enhancement image pick-up mode. It should be noted that a conceivable example of the distortion enhancement image pick-up mode includes a fish-eye image pick-up mode. In addition, the fish-eye image pick-up mode is similarly regarded as a different image pick-up mode between a 3D moving image and a 3D still image.

According to a thirteenth aspect of the present invention, the stereoscopic image pick-up apparatus according to the tenth aspect further includes: a unit which selects a continuous photographing mode in which a plurality of time-series images are acquired from the plurality of image pick-up units until a preset number of images are acquired or while a photographing instruction is being given; and an internal storage unit which temporarily stores therein the images being photographed in the continuous photographing mode. In this stereoscopic image pick-up apparatus, the shading correction unit reads out the plurality of images stored in the internal storage unit after an end of the photographing in the continuous photographing mode, to perform thereon the shading correction. The shading correction is performed after the end of the continuous photographing, whereby it is possible to prevent a reduction in continuous photographing speed.

According to a fourteenth aspect of the present invention, the stereoscopic image pick-up apparatus according to any one of the first aspect to the thirteenth aspect further includes: a mode selection unit which selects a photographing mode or a reproduction mode; and a recording unit which records, into a recording medium, information indicating the image pick-up mode and information indicating the optical axis deviation amount acquired by the optical axis deviation amount acquisition unit together with the plurality of images acquired by the image pick-up control unit in the photographing mode selected by the mode selection unit, in association with the plurality of acquired images. In this stereoscopic image pick-up apparatus, the distortion correction unit and the image cut-out unit read out, from the recording medium, the pieces of information recorded in association with the images together with the plurality of images in the reproduction mode selected by the mode selection unit, to perform the distortion correction and the image cut-out process on the plurality of read-out images on the basis of the distortion correction formula and the optical axis deviation amount corresponding to the pieces of read-out information. The distortion correction and the image cut-out process are not performed at the time of photographing but performed at the time of reproduction, whereby an amount of processing at the time of the photographing can be reduced. Particularly at the time of photographing a 3D moving image, a high-definition 3D moving image can be photographed and recorded at a high frame rate.

According to a fifteenth aspect of the present invention, in the stereoscopic image pick-up apparatus according to the fourteenth aspect, the recording unit records, into the recording medium, the images which have been subjected to the distortion correction and the image cut-out process in the reproduction mode. It should be noted that the images after the processing such as the distortion correction may be recorded so as to overwrite the images before the processing, or may be recorded separately from the images before the processing.

According to a sixteenth aspect of the present invention, the stereoscopic image pick-up apparatus according to any one of the first aspect to the fifteenth aspect further includes a parallax amount adjustment unit which adjusts a parallax amount between the plurality of images outputted from the plurality of image pick-up units. In this stereoscopic image pick-up apparatus, the image cut-out unit performs, at a time of the cut-out process of the images for stereoscopic display, the cut-out process on the images whose cut-out position is further adjusted on the basis of the parallax amount adjusted by the parallax amount adjustment unit. This makes it possible to perform the cut-out process on the plurality of images so as to obtain a parallax amount matching with a user's preference.

Advantageous Effects of Invention

According to the present invention, even in the case of performing distortion correction with correction accuracy which is different for each image pick-up mode for photographing a 3D moving image, a 3D still image, or the like, it is possible to obtain a plurality of images which do not have optical axis deviation between images for stereoscopic view after the distortion correction and thus are easy to stereoscopically view.

BRIEF DESCRIPTION OF DRAWINGS

FIG. 4A is a diagram illustrating an example of a table which is recorded into an EEPROM at the time of the optical axis adjustment before the shipment.

FIG. 4B is a diagram illustrating an example of the table which is recorded into the EEPROM at the time of the optical axis adjustment before the shipment.

FIG. 4C is a diagram illustrating an example of the table which is recorded into the EEPROM at the time of the optical axis adjustment before the shipment.

FIG. 9 is a diagram illustrating a table in which the optical axis deviation amount after the distortion correction is held for each zoom position and each focus position.

FIG. 10 is a diagram illustrating an example of calculating part of the optical axis deviation amounts stored in the table of FIG. 9 by means of linear interpolation.

FIG. 11 is a flow chart showing a second embodiment of the image processing illustrated in FIG. 5.

DESCRIPTION OF EMBODIMENTS

Hereinafter, embodiments of a stereoscopic image pick-up apparatus according to the present invention are described with reference to the accompanying drawings.

[External Appearance of Stereoscopic Image Pick-Up Apparatus]

Figure 1A:
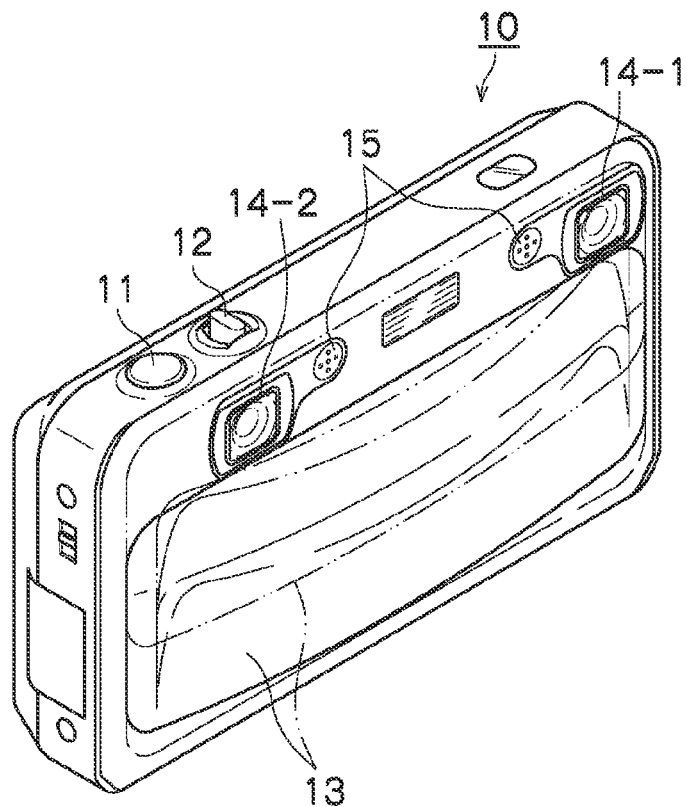
FIG. 1A is a view illustrating an external appearance of a stereoscopic image pick-up apparatus according to the present invention.
Figure 1B:
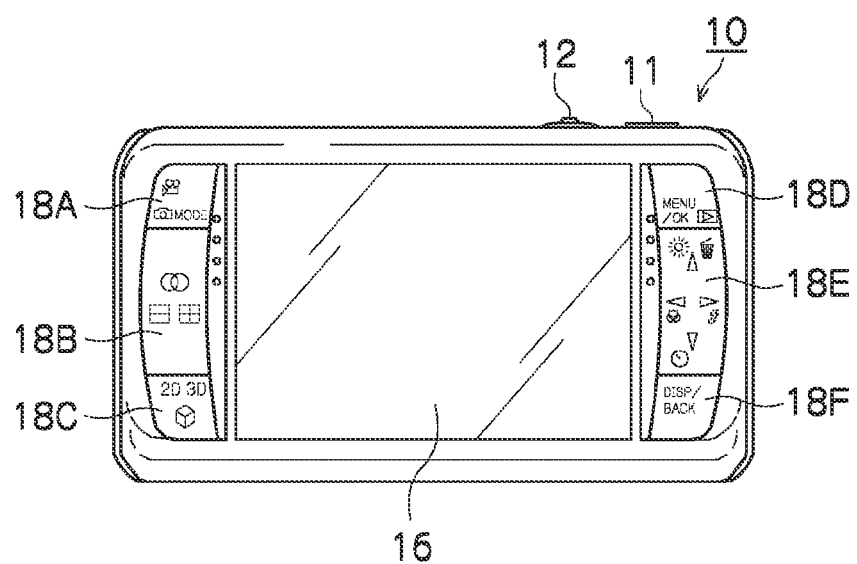
FIG. 1B is a view illustrating an external appearance of the stereoscopic image pick-up apparatus according to the present invention.

FIG. 1 are views each illustrating an external appearance of the stereoscopic image pick-up apparatus according to the present invention. FIG. 1A is a perspective view of the stereoscopic image pick-up apparatus which is observed from a front thereof, and FIG. 1B is a rear view thereof.

The stereoscopic image pick-up apparatus (compound eye camera) 10 is a digital camera which is capable of recording and reproducing 2D/3D still images and 2D/3D moving images, and as illustrated in FIG. 1A and FIG. 1B, a shutter button 11 and a zoom button 12 are provided on an upper surface of a thin cuboid camera main body.

A lens barrier 13 having a width which is substantially the same as a horizontal width of the camera main body is provided on a front surface of the camera main body so as to be movable in the vertical direction of the camera main body. The lens barrier 13 is moved in the vertical direction between a position indicated by an alternate long and two short dashes line and a position indicated by a solid line, whereby front surfaces of paired right and left photographing optical systems 14-1 and 14-2 can be opened/closed at the same time. It should be noted that zoom lenses of refractive optical systems are used as the photographing optical systems 14-1 and 14-2. In addition, the camera can be powered on/off in conjunction with an opening/closing operation of the front surfaces of the lenses by the lens barrier 13.

As illustrated in FIG. 1B, a liquid crystal monitor 16 for 3D is provided in a central portion of a rear surface of the camera main body. The liquid crystal monitor 16 can display a plurality of parallax images (an image for a right eye and an image for a left eye) as directional images each having a predetermined directivity, by means of a parallax barrier. It should be noted that a monitor including a lenticular lens, a monitor on which the image for the right eye and the image for the left eye can be individually viewed by wearing special glasses such as polarized glasses and liquid crystal shutter glasses, and the like can be adopted as the liquid crystal monitor 16 for 3D.

Various operation switches are provided to the right and left of the liquid crystal monitor 16. An operation switch 18A is a changeover switch for switching between still image photographing and moving image photographing, an operation switch 18B is a parallax adjustment switch for adjusting parallax amounts of the image for the right eye and the image for the left eye, and an operation switch 18C is a changeover switch for switching between 2D image pick-up and 3D image pick-up. In addition, an operation switch 18D is a seesaw key which functions as both of a MENU/OK button and a reproduction button, an operation switch 18E is a multifunctional arrow key, and an operation switch 18F is a DISP/BACK key.

The MENU/OK button is an operation switch which is provided with: a function as a menu button for giving an instruction to display a menu on a screen of the liquid crystal monitor 16; and a function as an OK button for giving an instruction to determine and execute a selected content. The reproduction button is a button for switching from a photographing mode to a reproduction mode. The arrow key is an operation switch for inputting an instruction in four directions, that is, up, down, right, and left, and a micro button, a flash button, a self-timer button, and the like are assigned to the arrow key. In addition, in the case where the menu is selected, the arrow key functions as a switch (cursor movement operation unit) for giving an instruction to select an item from the menu screen or to select various setting items from each menu. In addition, the right and left key included in the arrow key function as frame-by-frame advance (forward/reverse advance) buttons in the reproduction mode. The DISP/BACK key is used for switching a display mode of the liquid crystal monitor 16, cancelling an instruction content on the menu screen, or returning to the previous operation state.

It should be noted that, in FIG. 1A, reference numeral 15 designates a stereo microphone.

[Internal Configuration of Stereoscopic Image Pick-Up Apparatus]

Figure 2:
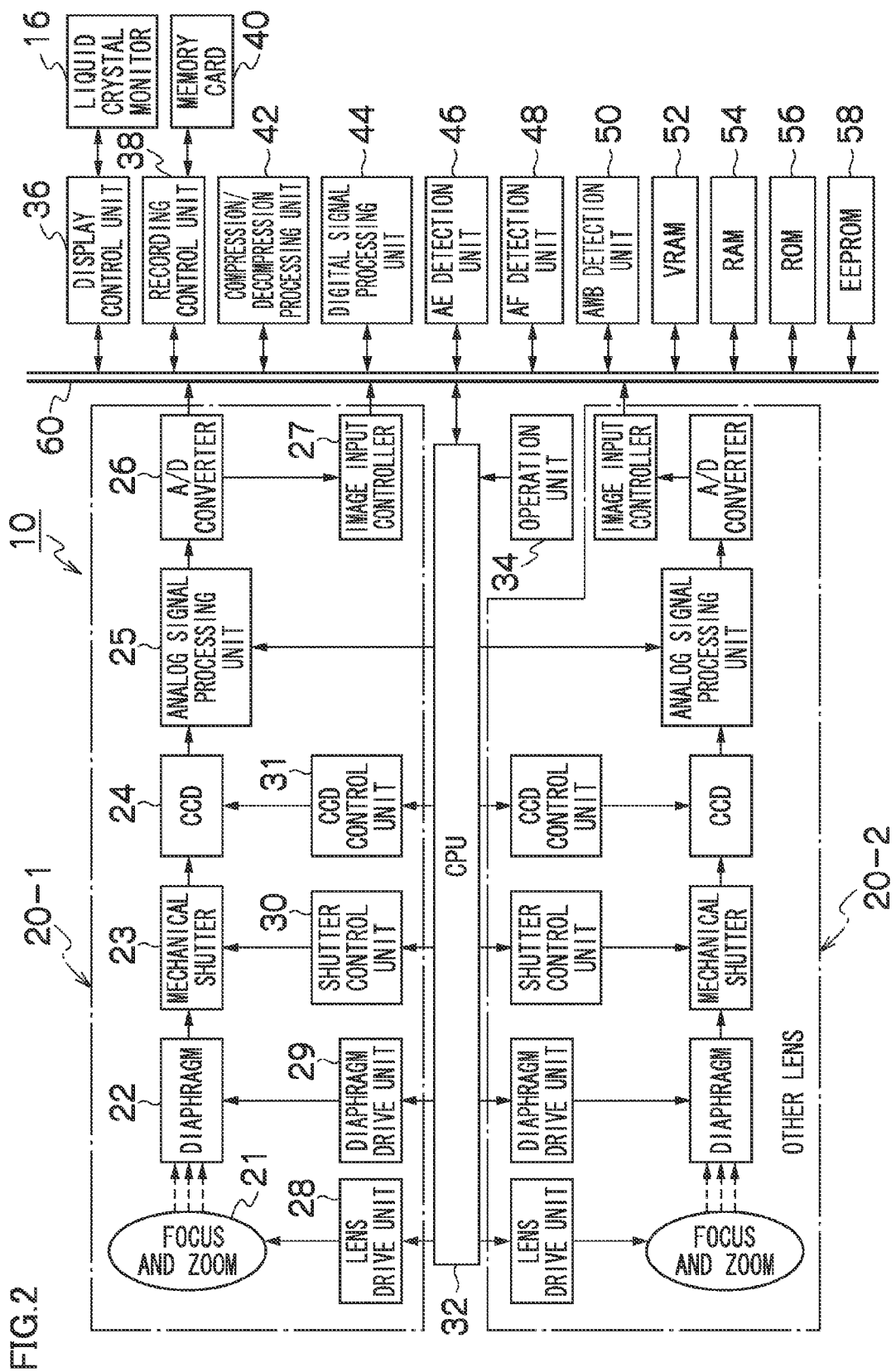
FIG. 2 is a block diagram illustrating an embodiment of the stereoscopic image pick-up apparatus according to the present invention.

FIG. 2 is a block diagram illustrating an embodiment of the stereoscopic image pick-up apparatus 10.

As illustrated in FIG. 2, the stereoscopic image pick-up apparatus 10 mainly includes: a plurality of image pick-up units 20-1 and 20-2; a central processing unit (CPU) 32; an operation unit 34 including the shutter button 11, the zoom button 12, and the various operation switches described above; a display control unit 36; the liquid crystal monitor 16; a recording control unit 38; a compression/decompression processing unit 42; a digital signal processing unit 44; an AE (Automatic Exposure) detection unit 46; an AF (Auto Focus) detection unit 48; an AWB (Automatic White Balance) detection unit 50; a VRAM 52; a RAM 54; a ROM 56; and an EEPROM 58. It should be noted that the image pick-up units 20-1 and 20-2 pick up two parallax images, that is, the image for the left eye and the image for the right eye having a parallax therebetween, and alternatively, the number of image pick-up units 20 may be three or more.

The image pick-up unit 20-1 which picks up the image for the left eye includes: a prism (not shown); the photographing optical system 14-1 (FIG. 1A) formed of a focus lens and a zoom lens 21; an optical unit formed of a diaphragm 22 and a mechanical shutter 23; a solid-state image pick-up element (CCD) 24; an analog signal processing unit 25; an A/D converter 26; an image input controller 27; a lens drive unit 28 which drives the optical unit; a diaphragm drive unit 29; a shutter control unit 30; and a CCD control unit 31 which controls the CCD 24. It should be noted that the image pick-up unit 20-2 which picks up the image for the right eye has the same configuration as that of the image pick-up unit 20-1 which picks up the image for the left eye, and hence description of the specific configuration thereof is omitted.

The CPU 32 controls in an integrated manner an entire operation of the camera in accordance with a predetermined control program on the basis of an input from the operation unit 34. It should be noted that the ROM 56 stores therein the control program executed by the CPU 32, various pieces of data necessary for the control, and the like, and the EEPROM 58 stores therein various pieces of information indicating adjustment results at the time of adjustment before product shipment, for example, pixel defect information of the CCD 24, a correction parameter and a table which are used for image processing, and the like. It should be noted that the various pieces of information stored therein will be described in detail later.

In addition, the VRAM 52 is a memory which temporarily stores therein image data for display to be displayed on the liquid crystal monitor 16, and the RAM 54 includes a region for an arithmetic operation of the CPU 32 and a temporal storage region of the image data.

The focus lens and the zoom lens 21 included in the photographing optical system are driven by the lens drive unit 28, to thereby move back and forth along the optical axis. The CPU 32 controls the driving of the lens drive unit 28, and thus controls a position of the focus lens, to thereby perform focusing so that a subject comes into focus. Further, the CPU 32 controls a zoom position of the zoom lens in response to a zoom instruction from the zoom button 12 included in the operation unit 34, to thereby change a zoom factor.

The diaphragm 22 is configured by, for example, an iris diaphragm, and is driven to operate by the diaphragm drive unit 29. The CPU 32 controls the opening (aperture) of the diaphragm 22 via the diaphragm drive unit 29, to thereby control an amount of light entering the CCD 24.

The mechanical shutter 23 opens/closes an optical path, to thereby decide an exposure time of the CCD 24, and blocks unnecessary light from entering the CCD 24 when an image signal is read out from the CCD 24, to thereby prevent occurrence of smear. The CPU 32 outputs a shutter closing signal synchronized with an exposure end time point corresponding to the shutter speed to the shutter control unit 30, to thereby control the mechanical shutter 23.

The CCD 24 is configured by a two-dimensional color CCD solid-state image pick-up element. A large number of photodiodes are arranged in a two-dimensional manner on a light receiving surface of the CCD 24, and color filters are provided to each photodiode in a predetermined arrangement pattern.

An optical image of the subject which is imaged on the light receiving surface of the CCD via the optical unit thus configured is converted by such photodiodes into signal electric charges corresponding to an amount of the entering light. The signal electric charges accumulated in each photodiode are sequentially read out from the CCD 24 as a voltage signal (image signal) corresponding to the signal electric charges on the basis of a drive pulse supplied from the CCD control unit 31 in response to a command from the CPU 32. The CCD 24 has an electronic shutter function, and an electric charge accumulation time of the photodiodes is controlled, whereby an exposure time (shutter speed) is controlled. It should be noted that an electric charge accumulation start time point corresponding to the shutter speed is controlled by the electronic shutter, and the exposure end time point (electric charge accumulation end time point) is controlled by closing the mechanical shutter 23. In the present embodiment, the CCD 24 is used as the image pick-up element, and alternatively, an image pick-up element having other configuration, such as a CMOS sensor, may be adopted.

The analog signals of R, G, and B read out from the CCD 24 are subjected to correlated double sampling (CDS) and amplification by the analog signal processing unit 25, and then are converted by the A/D converter 26 into digital signals of R, G, and B.

The image input controller 27 includes a built-in line buffer having a predetermined capacity, in which the image signals (CCD RAW data) of R, G, and B which are subjected to the A/D conversion by the A/D converter 26 are temporarily accumulated to be stored into the RAM 54 via a bus 60.

At the time of a 3D image pick-up mode, the CPU 32 controls the image pick-up unit 20-2 which picks up the image for the right eye, similarly to the image pick-up unit 20-1 which picks up the image for the left eye.

The AE detection unit 46 calculates a subject luminance necessary for AE control on the basis of an image signal taken in at the time of a half press of the shutter button 11, and outputs a signal indicating the subject luminance (photographing EV value) to the CPU 32. On the basis of the received photographing EV value, the CPU 32 sets the shutter speed (exposure time), the aperture, and the photographic sensitivity in the plurality of image pick-up units 20-1 and 20-2 according to a predetermined program chart.

The AF detection unit 48 adds up absolute values of high-frequency components of the image signal in the AF area which is taken in at the time of the half press of the shutter button 11, and outputs the added-up value (AF evaluation value) to the CPU 32. The CPU 32 moves the focus lens from the nearest distance toward the infinity, searches for an in-focus position at which the AF evaluation value detected by the AF detection unit 48 becomes the largest, and moves the focus lens to the in-focus position, to thereby perform focusing on a subject (main subject). It should be noted that, at the time of photographing a moving image, the CPU 32 performs so-called hill climbing control in which the focus lens is moved so that the AF evaluation value always has the largest value.

The AWB detection unit 50 automatically obtains a light source type (color temperature of a subject field) on the basis of image signals of R, G, and B acquired at the time of actual photographing, and reads out corresponding white balance gain from a table which stores therein white balance gain (white balance correction values) of R, G, and B set in advance for each light source type.

The digital signal processing unit 44 includes a white balance correction circuit, a gradation conversion processing circuit (for example, gamma correction circuit), a synchronization circuit which interpolates spatial deviation of color signals of R, G, and B due to color filter arrangement in a single-plate CCD, to thereby match positions of the respective color signals with each other, a contour correction circuit, a luminance/color-difference signal generation circuit, and the like. The digital signal processing unit 44 performs image processing on the image signals (CCD RAW data) of R, G, and B stored in the RAM 54. That is, in the digital signal processing unit 44, the CCD RAW data of R, G, and B is multiplied by the white balance gain detected by the AWB detection unit 50, whereby white balance correction is performed. After that, the CCD RAW data is subjected to a predetermined process such as a gradation conversion process (for example, gamma correction), and then is converted into a YC signal formed of a luminance signal (Y signal) and a color-difference signal (Cr signal and Cb signal). The YC signal processed by the digital signal processing unit 44 is stored into the RAM 54.

In addition, the digital signal processing unit 44 includes: a distortion correction circuit which corrects lens distortion of the photographing optical systems of the plurality of image pick-up units 20-1 and 20-2; and an image cut-out processing circuit which cuts out an image of a predetermined cut-out area from each of the right and left viewpoint images, to thereby correct the optical axis deviation of the photographing optical systems of the plurality of image pick-up units 20-1 and 20-2. It should be noted that processing contents of the distortion correction circuit and the image cut-out processing circuit will be described in detail later.

The compression/decompression processing unit 42 compresses, at the time of recording into a memory card 40, the YC signal stored in the RAM 54 in response to a command from the CPU 32, and decompresses compressed compression data recorded in the memory card 40 to thereby obtain the YC signal. The recording control unit 38 records the compression data compressed by the compression/decompression processing unit 42 as an image file in a predetermined format (for example, in the case of a 3D still image, an image file in MP (Multi Picture) format; in the case of a 3D moving image, a moving image file in Motion JPEG, H.264, MPEG4, or MPEG4-MVC) into the memory card 40, or reads out the image file from the memory card 40.

The liquid crystal monitor 16 is used as an image display unit for displaying a photographed image, and is also used as a GUI (Graphical User Interface) for making various settings. In addition, the liquid crystal monitor 16 is used as an electronic view finder which displays a live view image (hereinafter, referred to as "through image") for checking an angle of view in the photographing mode. In the case where a 3D image is displayed on the liquid crystal monitor 16, the display control unit 36 displays the image for the left eye and the image for the right eye held in the VRAM 52 alternately pixel by pixel. The parallax barrier provided to the liquid crystal monitor 16 allows the right and left eyes of a user which observe at a predetermined distance to separately view the right and left images which are arranged alternately pixel by pixel. This enables stereoscopic view.

It should be noted that, although not illustrated in FIG. 2, the stereoscopic image pick-up apparatus 10 also has a function of recording and reproducing voice information (audio data) acquired by the stereo microphone 15 illustrated in FIG. 1A.

[First Embodiment of Optical Axis Adjustment Before Product Shipment]

Next, description is given of information for optical axis adjustment to be stored into the EEPROM 58 at the time of adjustment before product shipment.

Figure 3:
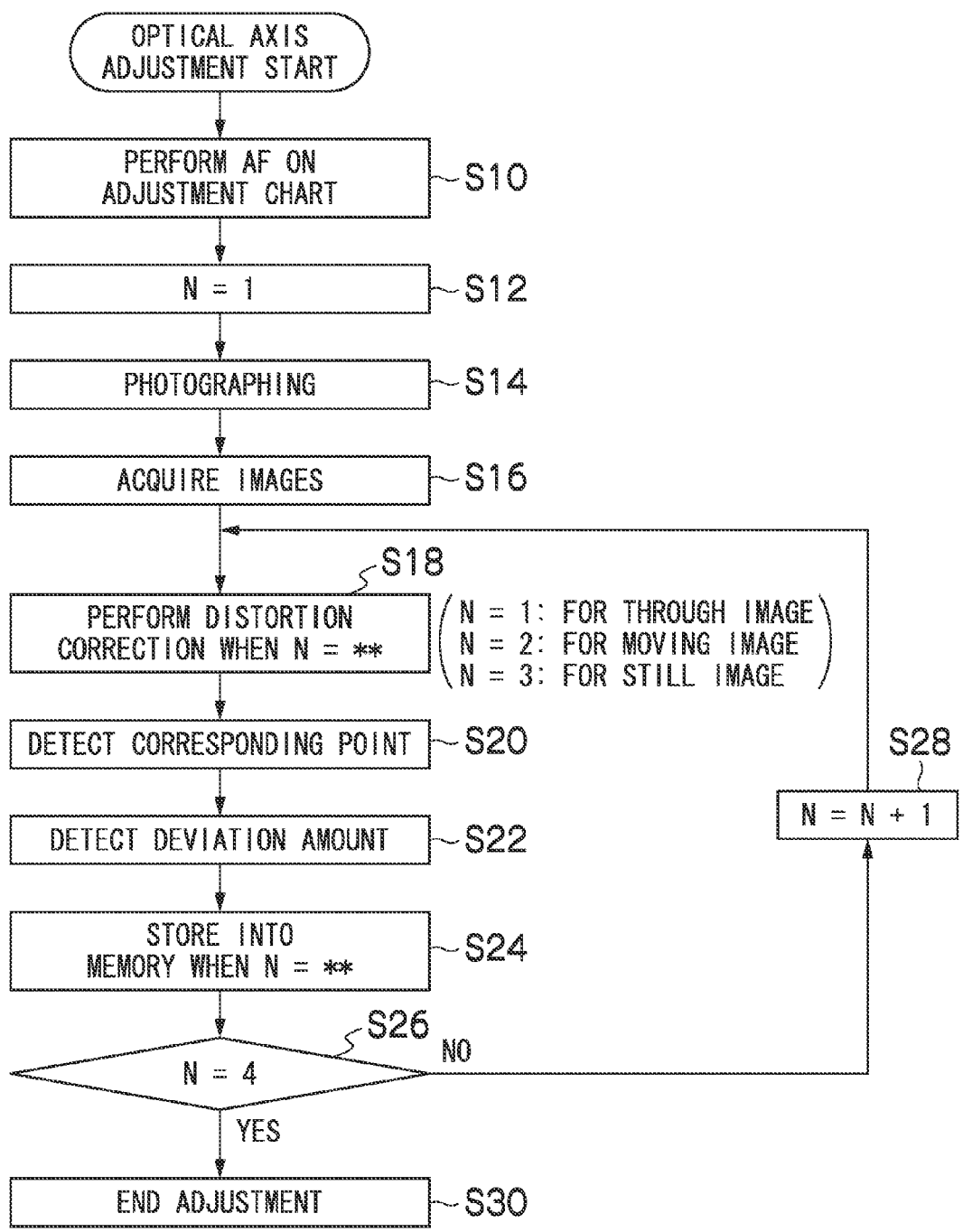
FIG. 3 is a flow chart showing a first embodiment of processing performed at the time of optical axis adjustment before shipment according to the present invention.

FIG. 3 is a flow chart showing a first embodiment of processing performed at the time of the optical axis adjustment before the shipment according to the present invention.

As shown in FIG. 3, first, the stereoscopic image pick-up apparatus 10 to be adjusted and an adjustment chart for adjusting the optical axis are set so as to be in a predetermined positional relation, and the focus position of each photographing optical system of the stereoscopic image pick-up apparatus 10 is adjusted, to thereby focus on the adjustment chart (Step S10). It should be noted that the adjustment chart is placed at a position of a convergence point at which the optical axes of the photographing optical systems intersect each other.

Next, a variable N indicating the image pick-up mode is set to 1 (Step S12). Here, N=1 indicates the image pick-up mode when a 3D through image is displayed on the liquid crystal monitor 16, N=2 indicates the image pick-up mode when a 3D moving image is photographed, and N=3 indicates the image pick-up mode when a 3D still image is photographed.

Subsequently, the adjustment chart is photographed, and the right and left images are acquired (Steps S14 and S16).

Distortion correction corresponding to the current image pick-up mode N is performed on each of the acquired right and left images (Step S18). Here, a used distortion correction formula for performing the distortion correction has correction accuracy which is different depending on the image pick-up mode N. For example, a second-order polynomial is used in the image pick-up mode (N=1) for a through image, a fourth-order polynomial is used in the image pick-up mode (N=2) for a moving image, and a sixth-order polynomial is used in the image pick-up mode (N=3) for a still image. It should be noted that a higher-order distortion correction formula can realize distortion correction with higher accuracy, but the amount of calculation increases. Therefore, the correction accuracy and the amount of calculation are in a trade-off relation.

After the distortion correction in Step S18, corresponding point detection for detecting a corresponding characteristic point between the right and left images is performed (Step S20). For example, block matching can be adopted as a method of detecting the corresponding point. That is, the degree of coincidence between: a block which has a predetermined block size and is cut out from the left image with respect to an arbitrary pixel thereof as the reference; and a block of the right image is evaluated, and a reference pixel of a block of the right image when the degree of coincidence between the blocks is the largest is defined as a pixel of the right image corresponding to the arbitrary pixel of the left image. In addition, for example, the sum of squares of a difference in luminance (SSD) between pixels in blocks may be used as a function for evaluating the degree of coincidence between the blocks in the block matching (SSD block matching).

After the corresponding point is detected as described above, a deviation amount of the corresponding point is detected (if a plurality of corresponding points are detected, an average of deviation amounts of the plurality of corresponding points are detected), and the detected deviation amount is stored into the EEPROM 58 in association with the image pick-up mode N as the optical axis deviation amount of the two photographing optical systems (Steps S22 and S24).

Next, it is determined whether or not N=4 (Step S26). If "No", N is incremented by 1 (Step S28), and the CPU 32 goes to Step S18. If "Yes", the adjustment process is ended (Step S30).

In this way, the optical axis deviation amount is stored into the EEPROM 58 for each image pick-up mode (N=1, 2, 3).

It should be noted that, in the case where the image pick-up optical system is a single focus lens, the optical axis deviation amount is acquired in advance in such a manner as described above, and on the other hand, in the case as in the present embodiment where the image pick-up optical system is a zoom lens, the optical axis deviation amount is acquired for each zoom position of the zoom lens.

In the case where the zoom position of the zoom lens has ten stages from a zoom position (Z1) at a wide end to a zoom position (Z10) at a telephoto end, the zoom lens is moved to each zoom position, and the processing from Step S14 to Step S24 described above is performed for each zoom position, whereby the optical axis deviation amount is stored into the EEPROM 58 for each zoom position.

It should be noted that the distortion correction formula corresponding to each zoom position is used in the distortion correction in Step S18.

FIG. 4A to FIG. 4C each illustrate an example of a table showing the optical axis deviation amount for each image pick-up mode, the optical axis deviation amount being stored in the EEPROM 58.

FIG. 4A to FIG. 4C illustrate a table for a through image, a table for a still image, and a table for a moving image, respectively, and the respective tables store therein the optical axis deviation amount (the optical axis deviation amount in the vertical (V) direction) with respect to the right and left images for each zoom position. It should be noted that, in the case of a 3D image, the optical axis deviation in the V direction between respective images becomes problematic for stereoscopic view, and hence only the optical axis deviation amount in the V direction is stored, but not limited to this, the optical axis deviation amount in the horizontal (H) direction may be also stored.

In addition, a distortion correction formula for each image pick-up mode and each zoom position is also stored into the EEPROM 58. In this case, it is conceivable to store a general formula of the distortion correction formula which is the same for each zoom position with only a factor of each term being changed for each zoom position, or to store a distortion correction formula different for each zoom position.

[Photographing Operation]

Next, a photographing operation of a 3D moving image or a 3D still image by the stereoscopic image pick-up apparatus 10 according to the present invention is described with reference to a flow chart shown in FIG. 5.

Switching to a moving image photographing mode is made by the operation switch 18A illustrated in FIG. 1B, and switching to a 3D image pick-up mode is made by the operation switch 18C illustrated in FIG. 1B, whereby the photographing mode for photographing a 3D moving image (hereinafter, referred to as "3D moving image photographing mode") can be set. In addition, switching to a still image photographing mode is made by the operation switch 18A, and switching to the 3D image pick-up mode is made by the operation switch 18C, whereby the photographing mode for photographing a 3D still image (hereinafter, referred to as "3D still image photographing mode") can be set.

In Step S40, it is determined whether the photographing mode is set by the operation switches 18A and 18C to the 3D moving image photographing mode or the 3D still image photographing mode.

If it is determined that the photographing mode is set to the 3D moving image photographing mode, the CPU 32 determines whether or not an instruction to photograph a moving image (a full press of the shutter button 11 (turning on of a switch S2)) is given (Step S42). If the switch S2 is off, a 3D through image is displayed on the liquid crystal monitor 16 (Step S44).

In the case where the 3D through image is displayed, a distortion correction formula (second-order polynomial) for a through image is used to perform distortion correction on the right and left images which are sequentially acquired in a time-series manner from the right and left image pick-up units 20-1 and 20-2. Further, the optical axis deviation amounts of the right and left images corresponding to the current zoom position of the zoom lens are read out from the table for the through image illustrated in FIG. 4A, and images for the 3D through image are cut out from the images after the distortion correction so that these optical axis deviation amounts are cancelled. Then, the cut-out images are outputted to the liquid crystal monitor 16.

As a result, it is possible to display, on the liquid crystal monitor 16, the 3D through image in which the optical axis deviation different for each zoom position of the two image pick-up optical systems is corrected.

On the other hand, when the switch S2 is turned on, the CPU 32 starts photographing of the 3D moving image (Step S46).

When the photographing of the 3D moving image is started, image processing such as distortion correction and an image cut-out process and a recording process are performed on the right and left images which are sequentially acquired in a time-series manner from the right and left image pick-up units 20-1 and 20-2 (Step S48).

[First Embodiment of Image Processing]

Figure 5:
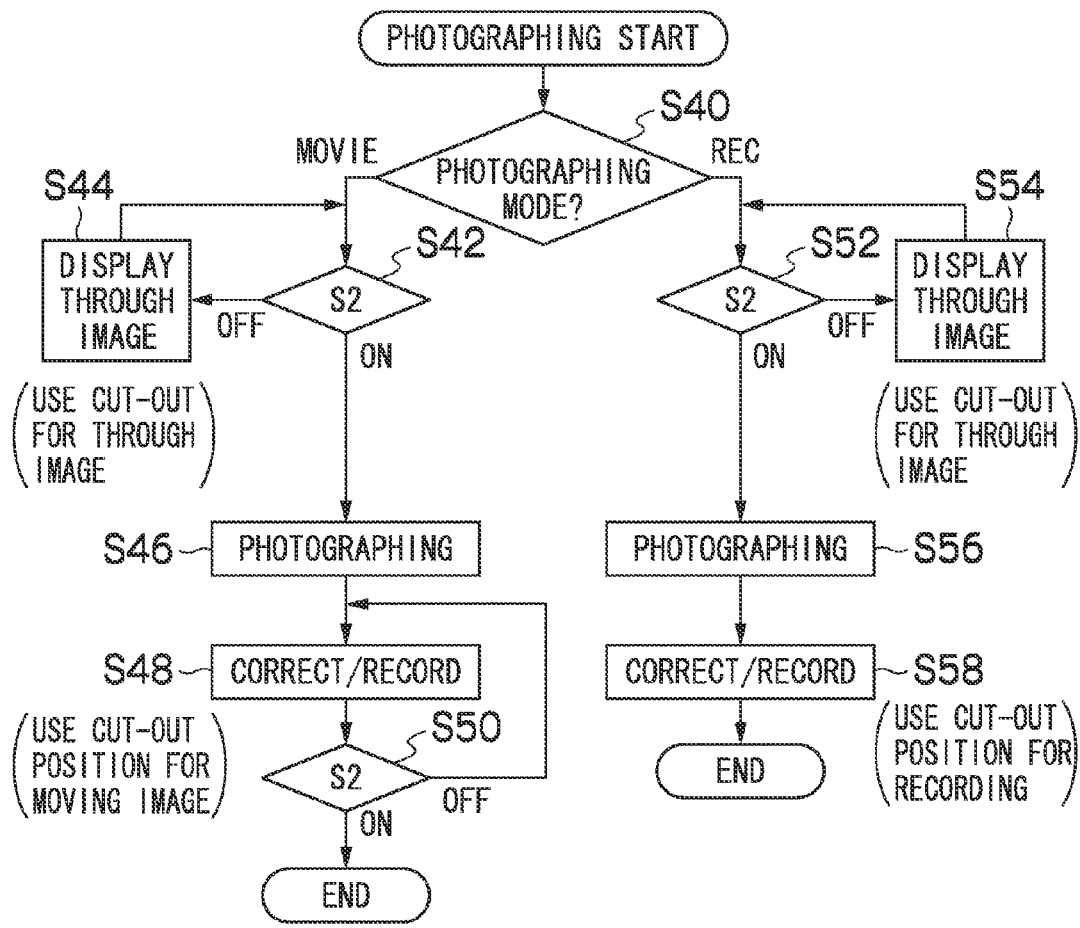
FIG. 5 is a flow chart showing a photographing operation according to each image pick-up mode of the stereoscopic image pick-up apparatus according to the present invention.
Figure 6:
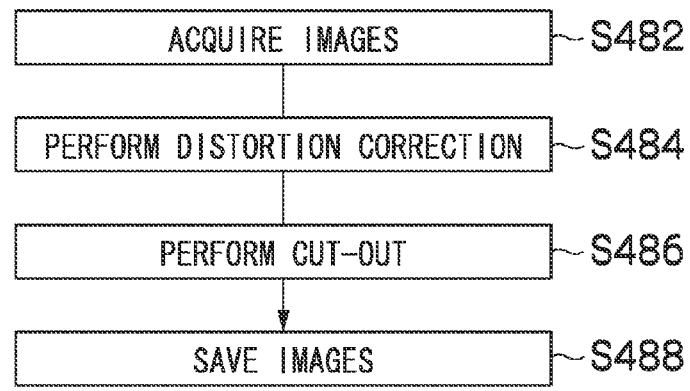
FIG. 6 is a flow chart showing a first embodiment of image processing illustrated in FIG. 5.

FIG. 6 is a flow chart showing a first embodiment of the image processing in Step S48 of FIG. 5 and the like.

In this figure, when the right and left images are acquired (Step S482), the distortion correction circuit included in the digital signal processing unit 44 uses a distortion correction formula which is the distortion correction formula (fourth-order polynomial) for the moving image and corresponds to the current zoom position of the zoom lens, to thereby perform distortion correction on the acquired right and left images (Step S484).

Subsequently, the optical axis deviation amount corresponding to the current zoom position (Z-pos) is read out from the table for the moving image of FIG. 4C, and on the basis of the read-out optical axis deviation amount, the cut-out range is moved by this optical axis deviation amount on the right and left images after the distortion correction, whereby the image cut-out process is performed (Step S486). As a result, the cut-out images are obtained as images whose optical axis deviation has been corrected.

The right and left images cut out as described above are each compressed in a predetermined compression format, and then are recorded into a moving image file created in the memory card 40 (Step S488). It should be noted that the recording process of the moving image is performed each time image processing of the prescribed number of frames for one second (in the case where the frame rate is 60 frames/second, 60 frames) is ended, and the compressed moving image is sequentially added to the moving image file. In addition, voice data acquired by the stereo microphone 15 is also compressed every one second to be recorded into the moving image file.

Returning to FIG. 5, it is determined whether or not the switch S2 is turned on again (Step S50). If the switch S2 is off, the process goes to Step S48, and the processing of the moving image is continued. When the switch S2 is turned on, the photographing of the 3D moving image is ended.

On the other hand, if it is determined in Step S40 that the photographing mode is set to the 3D still image photographing mode, the CPU 32 determines whether or not an instruction to photograph a still image (turning on of the switch S2) is given (Step S52). If the switch S2 is off, a 3D through image is displayed on the liquid crystal monitor 16 (Step S54). The display of the 3D through image on the liquid crystal monitor 16 is performed in the same manner as in Step S44 described above.

When the switch S2 is turned on, the CPU 32 performs photographing of the 3D still image (Step S56). It goes without saying that, when the two-stage stroke shutter button is half pressed before being full pressed, a switch S1 thereof is turned on, whereby photographing preparation operations before actual photographing, such as an AE process and an AF process, are performed.

Similarly to Step S48, image processing such as distortion correction and an image cut-out process and a recording process are performed on the right and left images which are acquired from the right and left image pick-up units 20-1 and 20-2 at the time of the actual photographing (Step S58). It should be noted that the distortion correction in Step S58 is performed by using a distortion correction formula which is a sixth-order polynomial with high correction accuracy, and the image cut-out process is performed on the basis of the optical axis deviation amount which is read out correspondingly to the current zoom position from the table for the still image of FIG. 4B.

[Second Embodiment of Optical Axis Adjustment Before Product Shipment]

Figure 7:
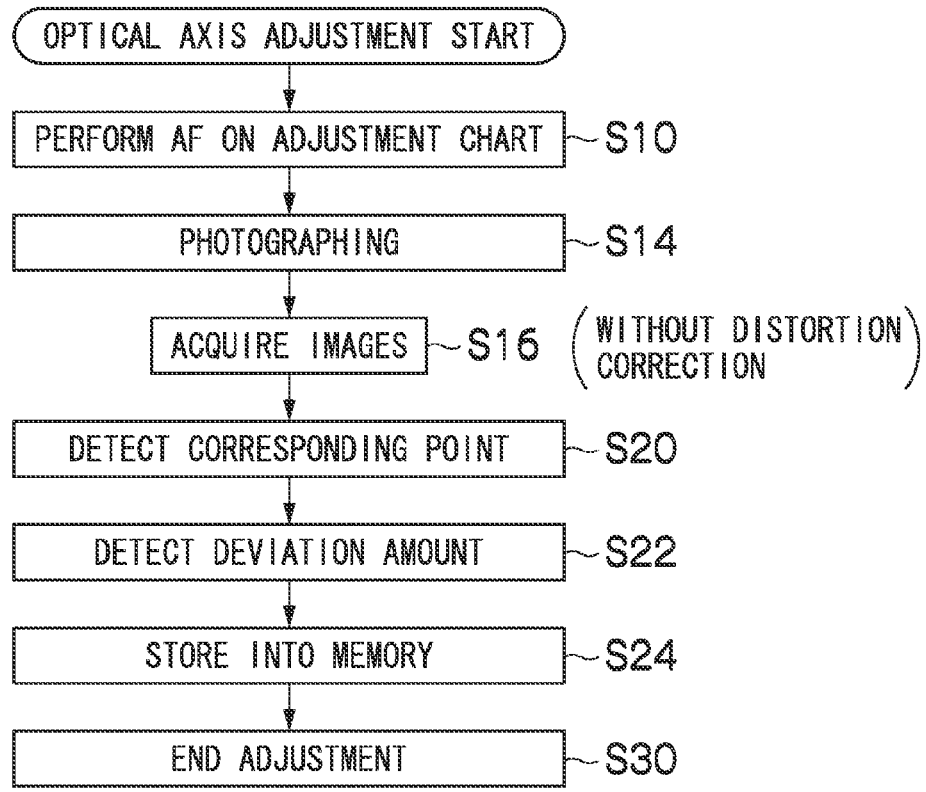
FIG. 7 is a flow chart showing a second embodiment of the processing performed at the time of the optical axis adjustment before the shipment according to the present invention.

FIG. 7 is a flow chart showing a second embodiment of the processing performed at the time of the optical axis adjustment according to the present invention. It should be noted that parts common to those of the first embodiment shown in FIG. 3 are designated by the same step numbers, and detailed description thereof is omitted.

In the second embodiment shown in FIG. 7, the processing of Steps S12, S18, S26, and S28 shown in FIG. 3 is omitted.

In the first embodiment shown in FIG. 3, the optical axis deviation amount is detected for each image pick-up mode for the through image, the moving image, and the still image to be stored into the EEPROM 58 (see FIG. 4A to FIG. 4C). On the other hand, in the second embodiment shown in FIG. 7, distortion correction is not performed on the right and left images acquired in Step S16, corresponding point detection of the right and left images is performed, and the optical axis deviation amounts of the right and left images are detected (Steps S20 and S22). Then, the detected optical axis deviation amounts are stored into the EEPROM 58 (Step S24). It should be noted that, similarly to the embodiment shown in FIG. 3, the optical axis deviation amount is stored into the EEPROM 58 for each zoom position of the zoom lens.

That is, in the second embodiment shown in FIG. 7, the optical axis deviation amounts of the right and left images before the distortion correction are detected and recorded, and the optical axis deviation amount for each image pick-up mode is not detected or recorded.

Figure 8:
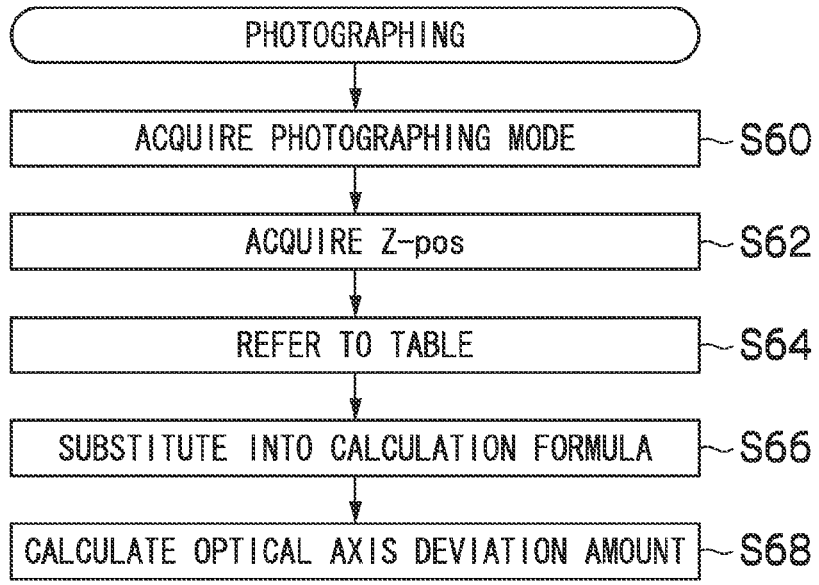
FIG. 8 is a flow chart showing an embodiment of calculating an optical axis deviation amount after distortion correction.

Then, with the use of a table of the optical axis deviation amount for each zoom position, which is stored in the EEPROM 58, the optical axis deviation amount after the distortion correction is calculated at the time of photographing as shown in FIG. 8.

In FIG. 8, information on the current image pick-up mode and information on the zoom position of the zoom lens are acquired (Steps S60 and S62).

The table stored in the EEPROM 58 is referred to on the basis of the acquired information on the zoom position, and the optical axis deviation amount corresponding to the zoom position is acquired (Step S64). In addition, a distortion correction formula (calculation formula) corresponding to the current image pick-up mode and the zoom position is acquired from the EEPROM 58 on the basis of the acquired current image pick-up mode and the acquired current zoom position.

Calculation is performed by substituting the optical axis deviation amount acquired in Step S64 into the acquired calculation formula, whereby the optical axis deviation amount after the distortion correction is calculated (Steps S66 and S68).

The optical axis deviation amount calculated in the above is used in the image cut-out process in Steps S44, S48, and S58 shown in FIG. 5 and Step S486 shown in FIG. 6.

As described above, the optical axis deviation amount before the distortion correction is held in the EEPROM 58, a value held in the EEPROM 58 is substituted into the calculation formula for the distortion correction at the time of an actual image cut-out process, and the optical axis deviation amount after the distortion correction is thus calculated. In this way, memory occupation in the EEPROM 58 can be reduced, and even in the case where firmware and the like are changed (including a change in distortion correction), the cut-out position can be easily changed.

It should be noted that, although the table of the optical axis deviation amounts stores therein the optical axis deviation amount for each zoom position as illustrated in FIG. 4A to FIG. 4C, the table may store therein only the optical axis deviation amounts of at least two zoom positions (for example, the wide end and the telephoto end), and the optical axis deviation amount of a zoom position other than the stored zoom positions may be calculated by linearly interpolating the stored optical axis deviation amounts of the at least two zoom positions in accordance with the current zoom position.

[Third Embodiment of Optical Axis Adjustment Before Product Shipment]

The optical axis centers of the right and left images acquired by the stereoscopic image pick-up apparatus 10 are deviated by not only the zoom position of the zoom lens but also the focus position of the focus lens.

In view of the above, in a third embodiment, the optical axis deviation amount for each focus position of the focus lens is acquired in inspection before shipment to be stored into the EEPROM 58.

That is, the optical axis deviation amount is detected for each focus position (from a focus position (F1) in the nearest distance toward a focus position (Fn) in the infinity) of the focus lens. For example, the adjustment chart is placed in a subject distance corresponding to a certain focus position, and the optical axis deviation amount is detected for each zoom position while changing the zoom position of the zoom lens. This optical axis deviation amount may be detected on the basis of the right and left images after the distortion correction as described in the first embodiment shown in FIG. 3, or may be detected on the basis of the right and left images before the distortion correction as described in the second embodiment shown in FIG. 7.

The detection of the optical axis deviation amount is performed as described above while the position of the adjustment chart is sequentially moved to a position corresponding to the focus position, whereby the optical axis deviation amounts of all zoom positions and all focus positions are acquired.

FIG. 9 illustrates a table of the optical axis deviation amounts acquired correspondingly to zoom positions (Z1 to Zn) and all focus positions (F1 to Fn). It should be noted that, in the case of acquiring the optical axis deviation amount after the distortion correction, the table illustrated in FIG. 9 is created for each image pick-up mode.

Then, the optical axis deviation amount to be used in the image cut-out process in Steps S44, S48, and S58 shown in FIG. 5 and Step S486 shown in FIG. 6 is acquired by: selecting a table in accordance with the current image pick-up mode; and reading out, from the selected table, a corresponding optical axis deviation amount on the basis of the current zoom position and the current focus position.

In addition, in the case where the table illustrated in FIG. 9 stores therein the optical axis deviation amount before the distortion correction, the optical axis deviation amount read out correspondingly to the current zoom position and the current focus position is substituted into the distortion correction formula corresponding to the current image pick-up mode and the current zoom position, whereby the optical axis deviation amount after the distortion correction is calculated.

Further, the table illustrated in FIG. 9 stores therein the optical axis deviation amounts corresponding to all the zoom positions and all the focus positions, but not limited to this, as illustrated in FIG. 10, the optical axis deviation amounts of only two focus positions (a focus position (Near) in the nearest distance and a focus position (Inf) in the infinity) may be detected and stored, and the optical axis deviation amount of an intermediate focus position may be calculated by linearly interpolating the optical axis deviation amounts of the two focus positions with the intermediate focus position.

It should be noted that, in the case where the zoom position reaches the telephoto end and an amount of movement of the focus lens therefore becomes larger, it is preferable that the optical axis deviation amounts of three focus positions, that is, the nearest distance, an intermediate distance, and the infinity be detected and stored, and an optical axis deviation amount be calculated by linear interpolation from the nearest distance to the intermediate distance or from the intermediate distance to the infinity.

[Second Embodiment of Image Processing]

FIG. 11 is a flow chart showing a second embodiment of the image processing performed in Step S48 of FIG. 5 and the like. It should be noted that parts common to those of the first embodiment shown in FIG. 6 are designated by the same step numbers, and detailed description thereof is omitted.

Compared to the first embodiment shown in FIG. 6, the second embodiment of the image processing shown in FIG. 11 is different from the first embodiment in that Step S483 in which shading correction is performed is added before Step S484 in which distortion correction is performed.

That is, in Step S483, the luminance of each pixel of the right and left images acquired in Step S482 is corrected (shading correction) with the use of: tables which are provided separately for the right and left images and store therein shading correction values in accordance with a position of an angle of view; or shading correction values which are obtained by a calculation formula in accordance with the position of the angle of view.

After the brightnesses of the right and left images are made uniform by such shading correction, the distortion correction and the image cut-out process are performed, which thus enables the cut-out right and left images to have no difference in brightness therebetween.

[First Embodiment of Image Processing Performed at the Time of Continuous Photographing]

Respective images which are continuously photographed are appreciated as still images, and hence image processing similar to that of a 3D still image is required. That is, it is necessary to carry out, as the distortion correction, correction using a distortion correction formula with high correction accuracy.

However, in the case where a photographing interval at the time of continuous photographing is short, the distortion correction with high correction accuracy, the image cut-out process, and the like cannot be performed in real time.

Figure 12:
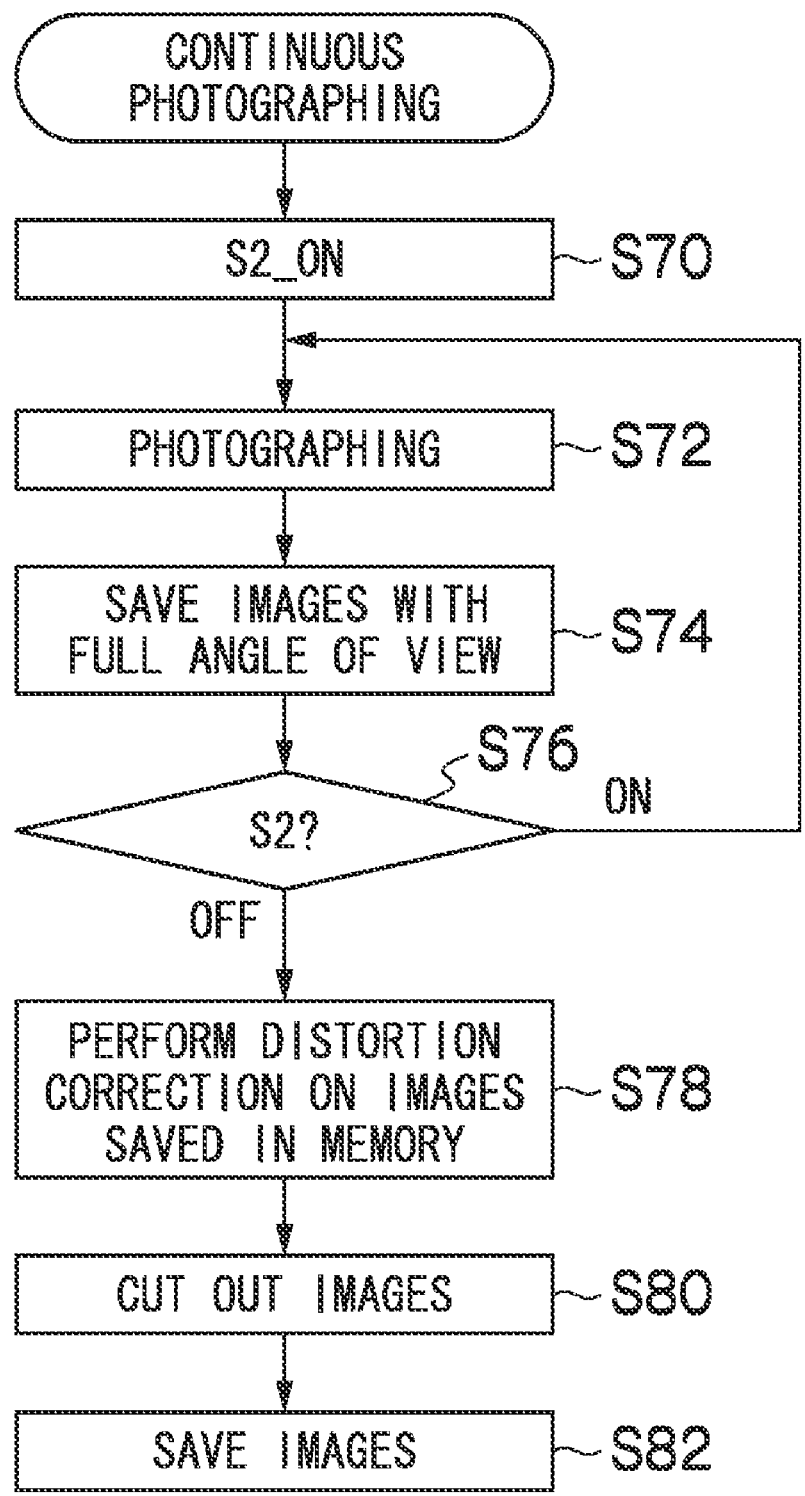
FIG. 12 is a flow chart showing a first embodiment of image processing performed at the time of continuous photographing.

FIG. 12 is a flow chart showing a first embodiment of the image processing performed at the time of continuous photographing.

When a continuous photographing mode is set and an instruction to continuously photograph images (turning on of the switch S2) is inputted (Step S70), the CPU 32 performs photographing of one frame in continuous shots (Step S72), and temporarily saves right and left images with a full angle of view into the RAM 54 (Step S74).

Subsequently, it is determined whether the switch S2 is on or off (Step S76). If the switch S2 is on, the CPU 32 goes to Step S72. If the switch S2 is off, the CPU 32 goes to Step S78. That is, while the switch S2 is on, the continuous photographing keeps being performed, and right and left images with a full angle of view keep being saved into the RAM 54.

When the switch S2 is turned off, the time-series right and left images saved in the RAM 54 are read out frame by frame, and are subjected to distortion correction by using a distortion correction formula corresponding to the zoom position of the zoom lens at the time of the continuous photographing and the continuous photographing mode (Step S78).

Subsequently, the optical axis deviation amount corresponding to the zoom position of the zoom lens at the time of the continuous photographing and the continuous photographing mode is read out from the EEPROM 58 or calculated, and on the basis of the optical axis deviation amount, images are cut out from the images with a full angle of view which have been subjected to the distortion correction, to thereby correct the optical axis deviation (Step S80).

The images cut out as described above are subjected to the compression process and the like, and then are recorded into the memory card 40 (Step S82).

[Second Embodiment of Image Processing Performed at the Time of Continuous Photographing]

Figure 13:
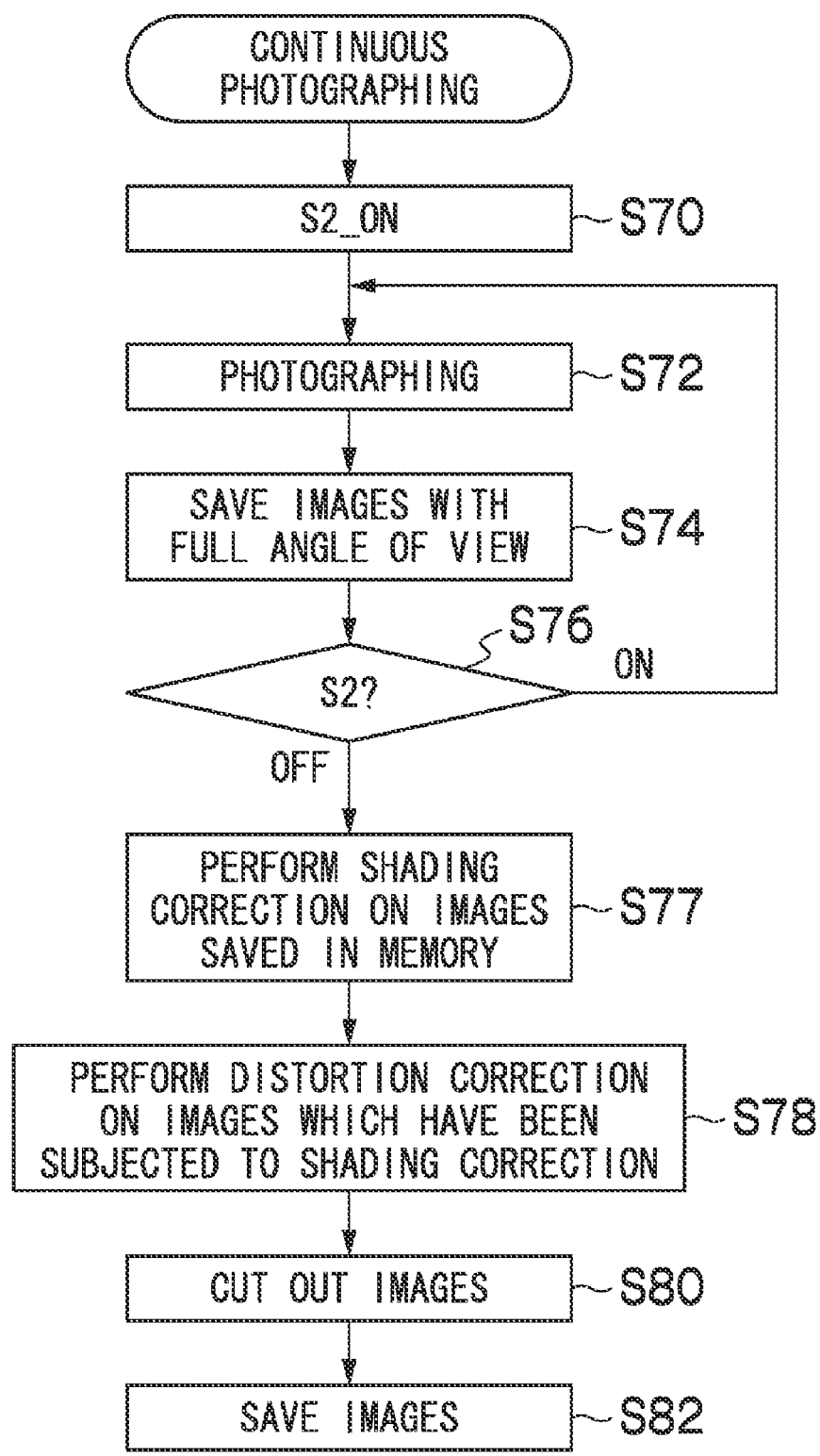
FIG. 13 is a flow chart showing a second embodiment of the image processing performed at the time of the continuous photographing.

FIG. 13 is a flow chart showing a second embodiment of the image processing performed at the time of the continuous photographing. It should be noted that parts common to those of the first embodiment of the image processing performed at the time of the continuous photographing shown in FIG. 12 are designated by the same step numbers, and detailed description thereof is omitted.

The second embodiment of the image processing performed at the time of the continuous photographing shown in FIG. 13 is different from the first embodiment in that processing of Step S77 is added between Steps S76 and S78.

That is, in Step S77, shading correction according to a position of an angle of view is performed on each of the right and left images saved in the RAM 54, whereby the brightnesses of the right and left images are made uniform. This enables the right and left images, on which the distortion correction and the image cut-out process are to be performed in the subsequent steps, to have no difference in brightness therebetween.

[Third Embodiment of Image Processing Performed at the Time of Continuous Photographing]

Figure 14:
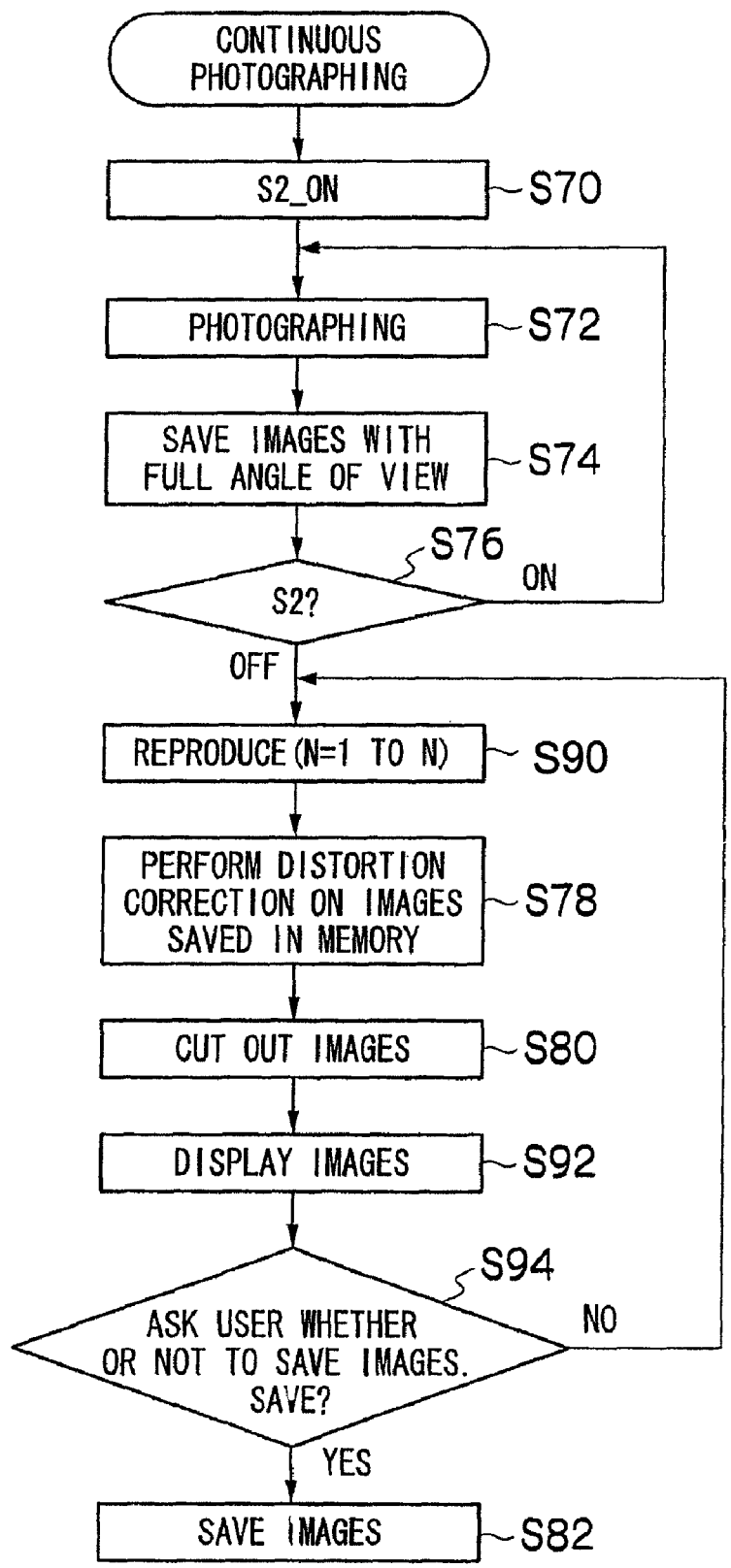
FIG. 14 is a flow chart showing a third embodiment of the image processing performed at the time of the continuous photographing.

FIG. 14 is a flow chart showing a third embodiment of the image processing performed at the time of the continuous photographing. It should be noted that parts common to those of the first embodiment of the image processing performed at the time of the continuous photographing shown in FIG. 12 are designated by the same step numbers, and detailed description thereof is omitted.

The third embodiment of the image processing performed at the time of the continuous photographing shown in FIG. 14 is different from the first embodiment in that, from among a plurality of time-series images which are continuously photographed, only an image which is designated by the user to be saved is saved into the memory card 40.

In FIG. 14, when the switch S2 is turned off (Step S76), the time-series right and left images saved in the RAM 54 are read out and reproduced in photographed order (Step S90).

Here, assuming that photographing of a 3D image is performed N times in the continuous photographing, Nth (N=1 to N indicating the photographed order) right and left images are read out, and the distortion correction and the image cut-out process are performed (Steps S78 and S80). The right and left images after this processing are displayed as 3D still images on the liquid crystal monitor 16 (Step S92).

The user determines whether or not to save a 3D still image into the memory card 40 while looking at the 3D still image displayed on the liquid crystal monitor 16 (Step S94). If "Yes" (for example, in the case where the MENU/OK button is turned on), the 3D still image displayed on the liquid crystal monitor 16 is saved into the memory card 40.

On the other hand, if "No" (for example, in the case where an instruction to advance frame by frame is given through the right and left keys included in the arrow key), the CPU 32 goes to Step S90, the next right and left images are read out from the RAM 54, and the same processing as described above is performed.

It should be noted that, in the above-mentioned embodiments, the continuous photographing is performed during the period during which the switch S2 is on, but not limited to this, a preset number of images may be continuously photographed when the switch S2 is turned on.

[First Embodiment of Photographing/Reproduction Process]

Figure 15:
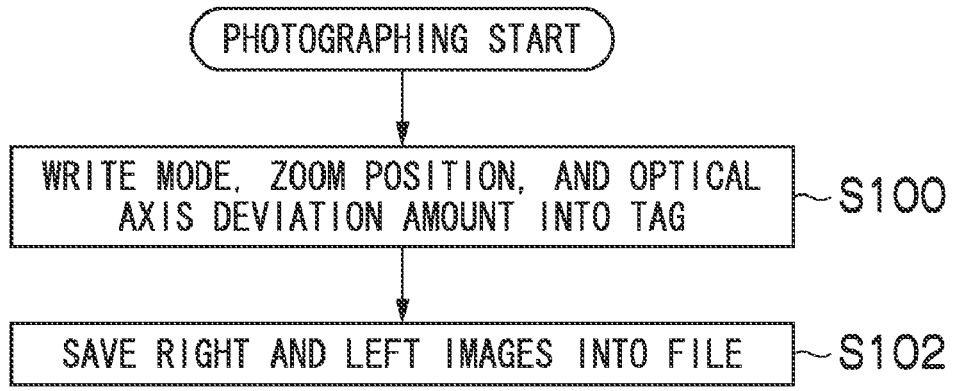
FIG. 15 is a flow chart showing a first embodiment of a photographing process by the stereoscopic image pick-up apparatus according to the present invention.
Figure 16:
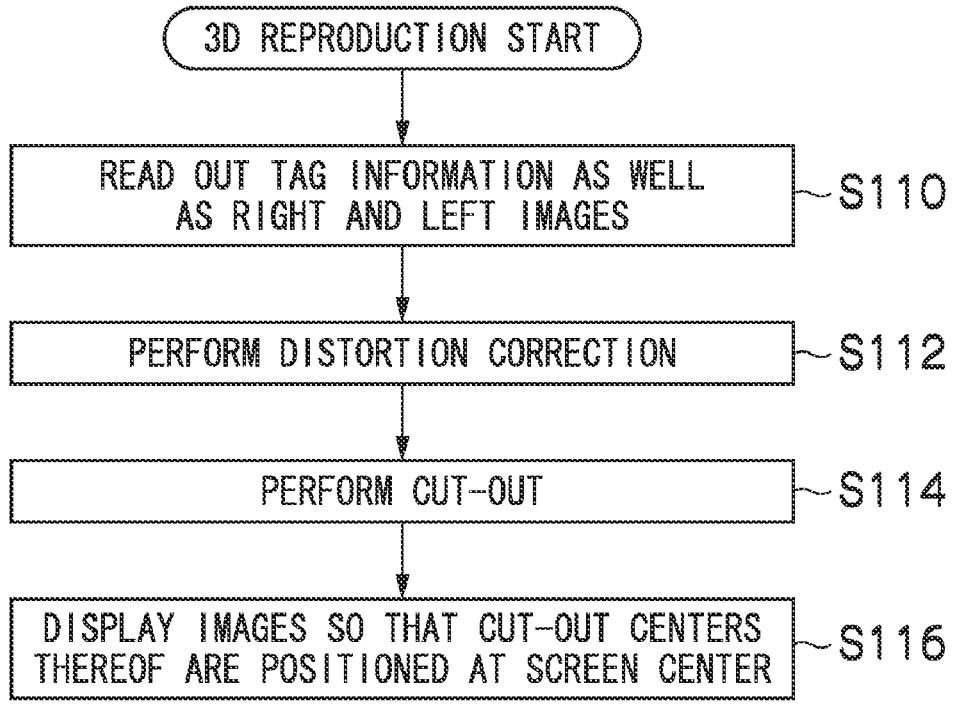
FIG. 16 is a flow chart showing a first embodiment of a reproduction process by the stereoscopic image pick-up apparatus according to the present invention.

FIG. 15 and FIG. 16 are flow charts showing a first embodiment of a photographing/reproduction process by the stereoscopic image pick-up apparatus 10 according to the present invention.

In FIG. 15, when the stereoscopic image pick-up apparatus 10 is set to the photographing mode, to thereby start photographing, the image pick-up mode (for example, the 3D moving image photographing mode or the 3D still image photographing mode), the zoom position of the zoom lens, and the optical axis deviation amount at the time of the started photographing are written into a tag of an image file recorded in the memory card 40 (Step S100). It should be noted that the used optical axis deviation amount is read out from the EEPROM 58 or calculated in accordance with the image pick-up mode, the zoom position, and the like.

In addition, the photographed right and left images with a full angle of view (moving images or still images) are saved into the image file (Step S102).

That is, at the time of the photographing, the above-mentioned distortion correction and the above-mentioned image cut-out process are not performed, and the images before correction and the information necessary for the correction are recorded into the tag.

Meanwhile, as shown in FIG. 16, when the stereoscopic image pick-up apparatus 10 is set to the reproduction mode, to thereby start reproduction, tag information as well as the right and left images is read out from an image file to be reproduced which is saved in the memory card 40 (Step S110).

Then, a distortion correction formula specified by the image pick-up mode and the zoom position contained in the tag information is acquired, and the acquired distortion correction formula is used to perform distortion correction on the read-out right and left images (Step S112).

Subsequently, images are cut out from the right and left images after the distortion correction on the basis of the optical axis deviation amount contained in the tag information, to thereby correct the optical axis deviation (Step S114).

The right and left images thus cut out are displayed so that the cut-out centers thereof are positioned at the screen center of the liquid crystal monitor 16 (Step S116), and thus are displayed as a 3D image which does not have optical axis deviation and is easy to stereoscopically view.

The images with a full angle of view are saved as described above, whereby it is possible to obtain a wider-angle photographic print in the case of 2D photographic printing. In addition, in the case where the user selects 2D reproduction, it is also possible to reproduce any one cut-out image of the above cut-out images. With this, even when the user gets eyestrain from 3D reproduction and thus makes switching to 2D reproduction, the size of the angle of view of the 3D image can be known.

It should be noted that, in the present embodiment, the optical axis deviation amount is recorded as tag information, and alternatively, coordinates of the optical axis center or coordinates of the opposite corners of the cut-out range may be recorded instead of the optical axis deviation amount. In short, any information on image cut-out may be recorded as long as the information can be used for correcting the optical axis deviation.

In addition, it is also possible to record, into the memory card 40, images which have been subjected to the distortion correction and the image cut-out process at the time of 3D reproduction. In this case, the original image file may be deleted, or both of the image files may be kept.

[Second Embodiment of Photographing/Reproduction Process]

Figure 17:
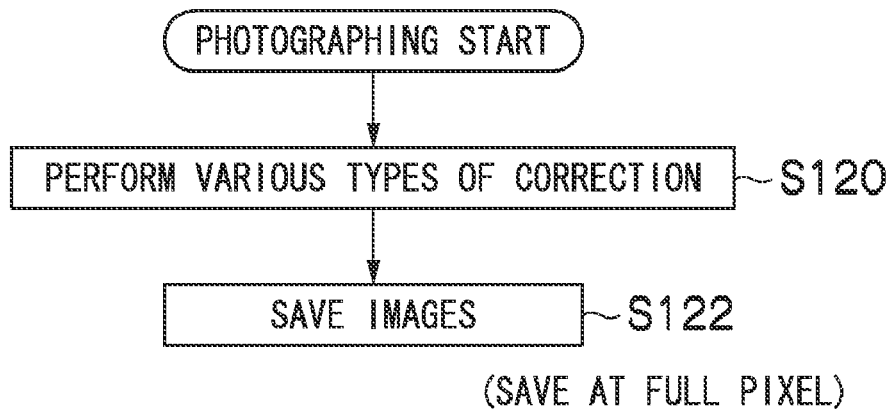
FIG. 17 is a flow chart showing a second embodiment of the photographing process by the stereoscopic image pick-up apparatus according to the present invention.
Figure 18:
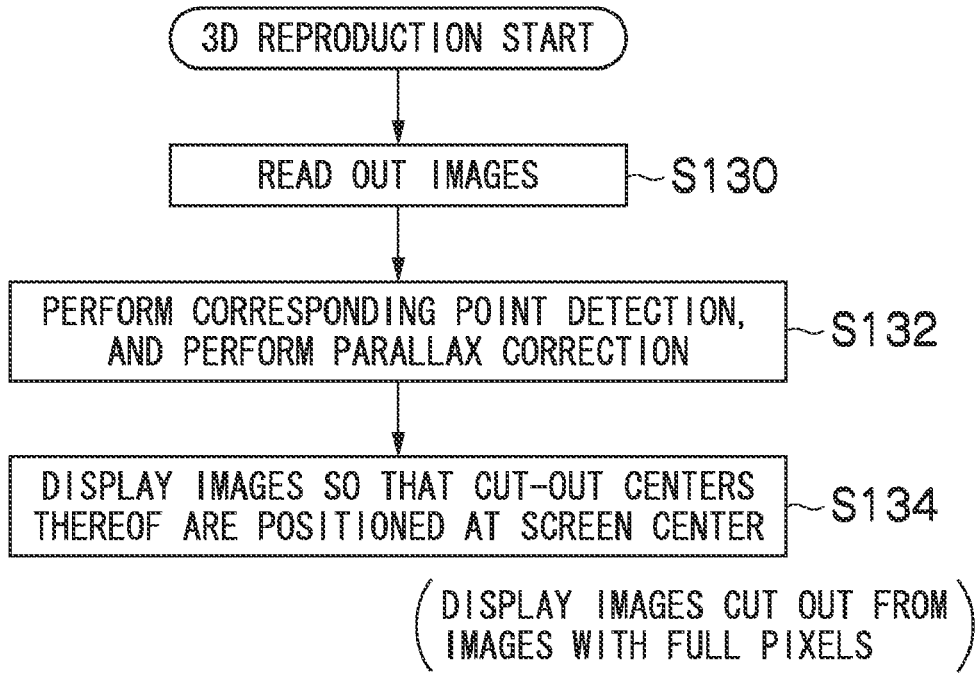
FIG. 18 is a flow chart showing a second embodiment of the reproduction process by the stereoscopic image pick-up apparatus according to the present invention.

FIG. 17 and FIG. 18 are flow charts showing a second embodiment of the photographing/reproduction process by the stereoscopic image pick-up apparatus 10 according to the present invention.

In FIG. 17, when the stereoscopic image pick-up apparatus 10 is set to the photographing mode, to thereby start photographing, various correction processes are performed on the photographed right and left images with a full angle of view (moving images or still images) (Step S120). The image processing in this case refers to image processing which excludes the image cut-out process for correcting the optical axis deviation of the right and left images and includes white balance correction, gamma correction, shading correction, and distortion correction.

The right and left images which have been subjected to the image processing are compressed in a predetermined compression format, and then are saved into the memory card 40 (Step S122).

Meanwhile, as shown in FIG. 18, when the stereoscopic image pick-up apparatus 10 is set to the reproduction mode, to thereby start reproduction, the right and left images are read out from an image file to be reproduced which is saved in the memory card 40 (Step S130).

Subsequently, corresponding point detection for detecting a corresponding characteristic point between the right and left images is performed, to thereby acquire information for correcting the optical axis deviation of the right and left images (Step S132). The corresponding point detection can be performed by, for example, block matching.

With reference to one image (for example, the left image) of the right and left images, a pixel on another image (right image) corresponding to each pixel on the left image is obtained by the corresponding point detection. As a result of such corresponding point detection, it is possible to obtain: regions in which a corresponding point between the right and left images can be detected; and regions in which a corresponding point therebetween cannot be detected. Then, a region surrounded by four outermost sides of the regions in which a corresponding point between the right and left images can be detected is detected for each of the right and left images, whereby the information for correcting the optical axis deviation of the right and left images can be acquired.

That is, the center of the region surrounded by the four sides corresponds to a cut-out region on the basis of which each image for stereoscopic view is cut out from the image with a full angle of view, and the center of the region surrounded by the four sides corresponds to the cut-out center.

The right and left images which are cut out respectively from the right and left images with a full angle of view on the basis of the cut-out regions obtained as described above are displayed so that the cut-out centers thereof are positioned at the screen center of the liquid crystal monitor 16 (Step S134). This enables the right and left images to be displayed as a 3D image which does not have optical axis deviation and is easy to stereoscopically view.

Figure 19:
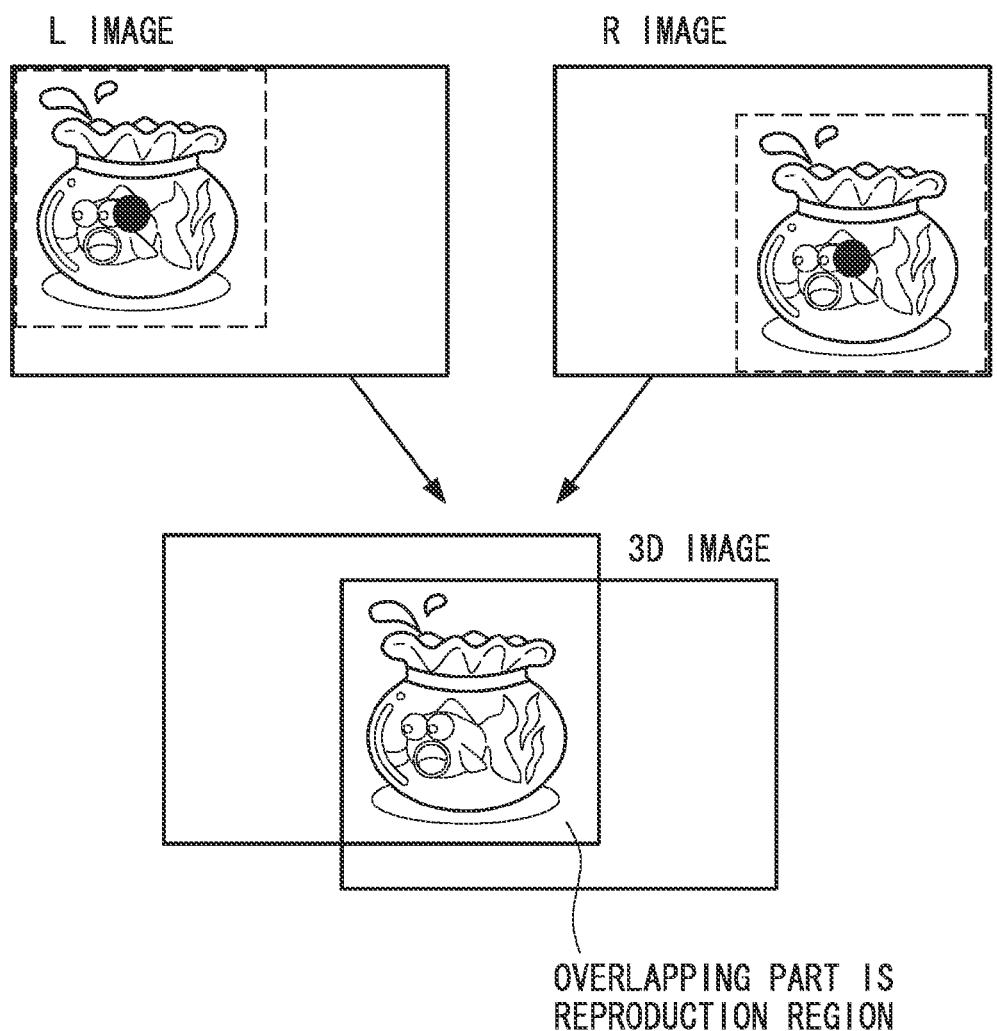
FIG. 19 is a view used for describing an image cut-out process in the second embodiment of the photographing and the reproduction respectively shown in FIG. 17 and FIG. 18.
Figure 20:
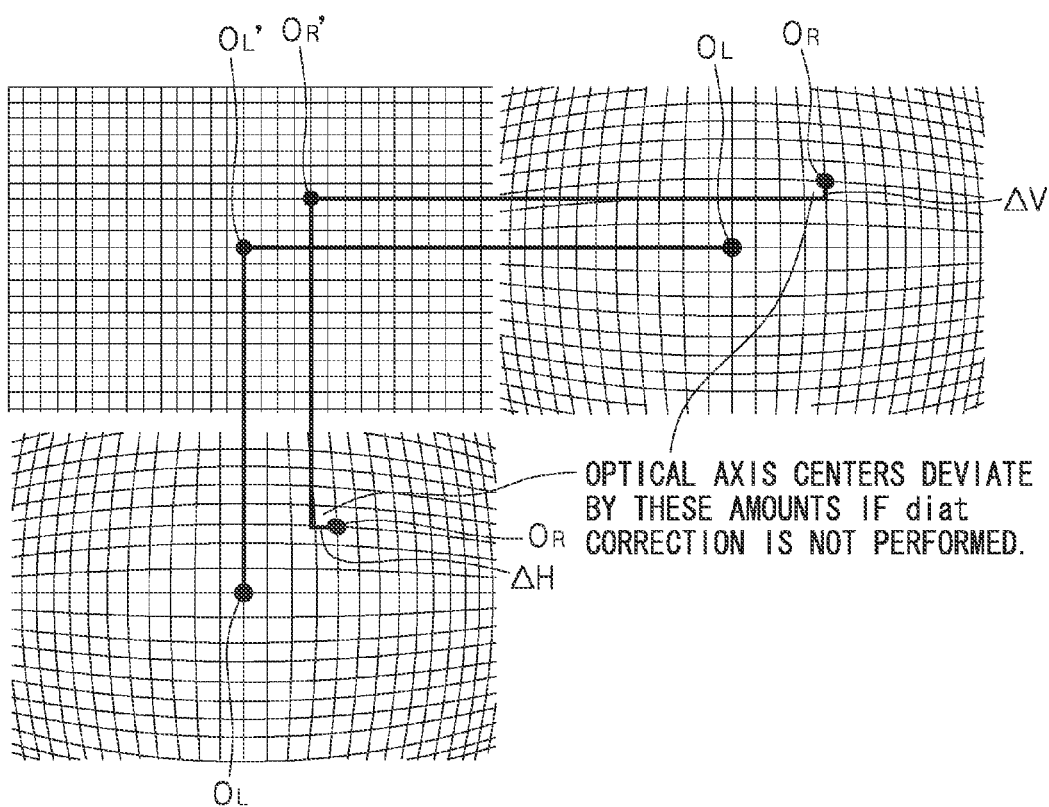
FIG. 20 is a view illustrating a state where optical axis centers of right and left images deviate between before and after distortion correction.

For example, as illustrated in FIG. 19, a cut-out region which is obtained by the corresponding point detection and is indicated by a dotted line (a region which is specified by a cut-out start point or the cut-out center and a cut-out size) is cut out from each of the right and left images with a full angle of view, and the respective cut-out images (an overlapping part between the right and left images) are displayed on the liquid crystal monitor 16 as the images for stereoscopic view. At this time, the right and left images are displayed so that the cut-out centers thereof coincide with each other, and hence the optical axis deviation (the deviation in the V direction) of the right and left images is corrected.

It should be noted that, in the above-mentioned example, only the overlapping part between the right and left images is displayed, but not limited to this, such display as described below in a) to c) may be performed.

a) A non-overlapping part between the right and left images is displayed as it is. As a result, the overlapping part is displayed in a 3D manner, and the non-overlapping part is displayed in a 2D manner.

b) At the time of displaying in a 3D manner, the non-overlapping part between the right and left images is covered by a decorative pattern such as a frame.

c) At the time of displaying in a 3D manner, the non-overlapping part between the right and left images is deleted (filled in black or white).

[Others]

Substantially the same subject exists at the cut-out centers of the right and left images which have been subjected to the image cut-out process, and hence MTFs (modulation transfer functions) at the cut-out center portions of the right and left images are measured, whereby a difference in resolution between the right and left images is calculated. Then, image quality settings (contour enhancement and gamma correction) and the like to the right and left images are changed, whereby the resolutions of the right and left images can be made uniform.

In addition, in the stereoscopic image pick-up apparatus 10, a 3D through image can be displayed on the liquid crystal monitor 16, and hence the user operates the parallax amount adjustment switch 18B (FIG. 1B) while looking at the 3D through image, and thus can adjust the parallax amount of a 3D image (moving image or still image).

That is, the parallax amount adjustment switch 18B is operated in the plus direction or the minus direction, whereby the parallax amount (parallax adjustment value) of the 3D image can be increased or reduced.

At the time of the image cut-out process, the images are cut out by using information on the optical axis deviation amount and the above-mentioned parallax adjustment value (shift amounts of the right and left images in the H direction), whereby a 3D image which does not have optical axis deviation in the V direction and has a stereoscopic effect matching with a user's preference can be recorded and reproduced.

It should be noted that the plurality of image pick-up modes in which distortion correction is performed at different correction accuracies are not limited to the present embodiment, and may include: an image pick-up mode in which the distortion correction is not performed; and an image pick-up mode in which distortion is enhanced, such as a fish-eye image pick-up mode.

In addition, in the present embodiment, the image cut-out process is performed on the images after the distortion correction, and inversely, the distortion correction may be performed on the images which have been subjected to the image cut-out process for correcting the optical axis deviation. It goes without saying that, in the image cut-out process in this case, the images should be cut out in consideration of the optical axis deviation caused by the distortion correction in the subsequent step.

In addition, it goes without saying that the present invention is not limited to the above-mentioned embodiments, and can be variously modified within a range not departing from the spirit of the present invention.

REFERENCE SIGNS LIST

10 . . . stereoscopic image pick-up apparatus, 11 . . . shutter button, 12 . . . zoom button, 14-1, 14-2 . . . photographing optical system, 16 . . . liquid crystal monitor, 20-1, 20-2 . . . image pick-up unit, 21 . . . focus lens and zoom lens, 24 . . . CCD, 25 . . . analog signal processing unit, 32 . . . central processing unit (CPU), 34 . . . operation unit, 44 . . . digital signal processing unit, 54 . . . RAM, 56 . . . ROM, 58 . . . EEPROM

The invention claimed is:

1. A stereoscopic image pick-up apparatus, comprising:
a plurality of image pick-up units each including:
a photographing optical system; and
an image pick-up element which subjects a subject image formed via the photographing optical system to photoelectric conversion, the plurality of image pick-up units picking up a plurality of images having a parallax between the plurality of image pick-up units;
a first storage unit which stores therein a distortion correction formula which is set for each of a plurality of image pick-up modes, the distortion correction formula having correction accuracy which is different for each of the plurality of image pick-up modes;
a distortion correction formula acquisition unit which acquires a distortion correction formula corresponding to a current image pick-up mode from among the distortion correction formulae stored in the first storage unit;
a second storage unit which stores therein a previously detected optical axis deviation amount of each photographing optical system included in the plurality of image pick-up units, the optical axis deviation amount having been subjected to distortion correction using the distortion correction formula which is set for each of the plurality of image pick-up modes;
an optical axis deviation amount acquisition unit which acquires an optical axis deviation amount corresponding to the current image pick-up mode, on the basis of: the optical axis deviation amount of each photographing optical system stored in the second storage unit; and the current image pick-up mode;
an image pick-up control unit which acquires the plurality of images from the plurality of image pick-up units in accordance with the current image pick-up mode;
a distortion correction unit which performs distortion correction on the plurality of images acquired by the image pick-up control unit, on the basis of the distortion correction formula which is acquired by the distortion correction formula acquisition unit correspondingly to the current image pick-up mode; and an image cut-out unit which performs a cut-out process of images for stereoscopic display on the plurality of images acquired by the image pick-up control unit, on the basis of the optical axis deviation amount acquired by the optical axis deviation amount acquisition unit correspondingly to the current image pick-up mode, wherein the photographing optical systems are adjusted so that optical axes of the photographing optical systems coincide with each other.

2. The stereoscopic image pick-up apparatus according to claim 1, further comprising: a zoom position detection unit which detects a current zoom position of each of the plurality of photographing optical systems, wherein:

the first storage unit stores therein the distortion correction formula according to the zoom position of each photographing optical system; and the distortion correction formula acquisition unit acquires, from the first storage unit, a distortion correction formula corresponding to the current image pick-up mode and the current zoom position of each photographing optical system.

3. The stereoscopic image pick-up apparatus according to claim 1, wherein:

the second storage unit stores therein the optical axis deviation amount of each photographing optical system according to the zoom position of each of the plurality of photographing optical systems; and the optical axis deviation amount acquisition unit acquires, from the second storage unit, a corresponding optical axis deviation amount in accordance with the current image pick-up mode and the current zoom position of each photographing optical system.

4. The stereoscopic image pick-up apparatus according to claim 2, wherein:

the second storage unit stores therein, as the optical axis deviation amount of each photographing optical system, the optical axis deviation amount after the distortion correction using the distortion correction formula corresponding to each image pick-up mode and the zoom position of each photographing optical system, in accordance with each image pick-up mode and the zoom position; and the optical axis deviation amount acquisition unit includes a read-out unit which reads out, from the second storage unit, a corresponding optical axis deviation amount in accordance with the current image pick-up mode and the current zoom position.

5. The stereoscopic image pick-up apparatus according to claim 2, wherein:

the second storage unit stores therein, as the optical axis deviation amount of each photographing optical system, an optical axis deviation amount before the distortion correction, in accordance with the zoom position of each photographing optical system; and the optical axis deviation amount acquisition unit includes a calculation unit which substitutes the optical axis deviation amount which is read out from the second storage unit on the basis of the current zoom position, into the distortion correction formula which corresponds to the current image pick-up mode and is acquired by the distortion correction formula acquisition unit, to thereby calculate the optical axis deviation amount after the distortion correction.

6. The stereoscopic image pick-up apparatus according to claim 2, wherein:

the second storage unit stores therein, as the optical axis deviation amount of each photographing optical system, information for calculating the optical axis deviation amount after the distortion correction using the distortion correction formula corresponding to each image pick-up mode and the zoom position of each photographing optical system, for each image pick-up mode; and the optical axis deviation amount acquisition unit includes a calculation unit which calculates a corresponding optical axis deviation amount on the basis of: the information which is read out from the second storage unit in accordance with the current image pick-up mode; and the current zoom position.

7. The stereoscopic image pick-up apparatus according to claim 2, further comprising: a focus position detection unit which detects a current focus position of each of the plurality of photographing optical systems, wherein:

the second storage unit stores therein the optical axis deviation amount after the distortion correction using the distortion correction formula corresponding to each image pick-up mode and the zoom position of each photographing optical system, in accordance with each image pick-up mode, the zoom position, and the focus position; and the optical axis deviation amount acquisition unit includes a read-out unit which reads out, from the second storage unit, a corresponding optical axis deviation amount in accordance with the current image pick-up mode, the current zoom position, and the current focus position.

8. The stereoscopic image pick-up apparatus according to claim 2, further comprising: a focus position detection unit which detects a current focus position of each of the plurality of photographing optical systems, wherein:

the second storage unit stores therein information for calculating the optical axis deviation amount after the distortion correction using the distortion correction formula corresponding to each image pick-up mode and the zoom position of each photographing optical system, in accordance with each image pick-up mode and the zoom position; and the optical axis deviation amount acquisition unit includes a calculation unit which calculates a corresponding optical axis deviation amount on the basis of: the information which is read out from the second storage unit in accordance with the current image pick-up mode and the current zoom position; and the current focus position.

9. The stereoscopic image pick-up apparatus according to claim 1, further comprising: a shading correction unit which performs shading correction on the plurality of images acquired by the image pick-up control unit, wherein the image cut-out unit performs the image cut-out process on the images which have been subjected to the shading correction by the shading correction unit.

10. The stereoscopic image pick-up apparatus according to claim 1, wherein the image cut-out unit performs the image cut-out process on the images which have been subjected to the distortion correction by the distortion correction unit.

11. The stereoscopic image pick-up apparatus according to claim 1, wherein the distortion correction unit performs the distortion correction on the images which have been subjected to the cut-out process by the image cut-out unit.

12. The stereoscopic image pick-up apparatus according to claim 1, wherein the plurality of image pick-up modes are two or more image pick-up modes of: an image pick-up mode set at a time of an operation of displaying a live view image on a display unit; a still image pick-up mode; a moving image pick-up mode; and a distortion enhancement image pick-up mode.

13. The stereoscopic image pick-up apparatus according to claim 10, further comprising:
   a unit which selects a continuous photographing mode in which a plurality of time-series images are acquired from the plurality of image pick-up units until a preset number of images are acquired or while a photographing instruction is being given; and
   an internal storage unit which temporarily stores therein the images being photographed in the continuous photographing mode, wherein
   the shading correction unit reads out the plurality of images stored in the internal storage unit after an end of the photographing in the continuous photographing mode, to perform thereon the shading correction.

14. The stereoscopic image pick-up apparatus according to claim 1, further comprising:
   a mode selection unit which selects a photographing mode or a reproduction mode; and
   a recording unit which records, into a recording medium, information indicating the image pick-up mode and information indicating the optical axis deviation amount acquired by the optical axis deviation amount acquisition unit together with the plurality of images acquired by the image pick-up control unit in the photographing mode selected by the mode selection unit, in association with the plurality of acquired images, wherein
   the distortion correction unit and the image cut-out unit read out, from the recording medium, the pieces of information recorded in association with the images together with the plurality of images in the reproduction mode selected by the mode selection unit, to perform the distortion correction and the image cut-out process on the plurality of read-out images on the basis of the distortion correction formula and the optical axis deviation amount corresponding to the pieces of read-out information.

15. The stereoscopic image pick-up apparatus according to claim 14, wherein the recording unit records, into the recording medium, the images which have been subjected to the distortion correction and the image cut-out process in the reproduction mode.

16. The stereoscopic image pick-up apparatus according to claim 1, further comprising: a parallax amount adjustment unit which adjusts a parallax amount between the plurality of images outputted from the plurality of image pick-up units, wherein
   the image cut-out unit performs, at a time of the cut-out process of the images for stereoscopic display, the cut-out process on the images whose cut-out position is further adjusted on the basis of the parallax amount adjusted by the parallax amount adjustment unit.

* * * * *